United States Patent [19]

Asami et al.

[11] Patent Number: 4,725,072
[45] Date of Patent: * Feb. 16, 1988

[54] REAR WHEEL SUSPENSION CONTROLLER

[75] Inventors: Ken Asami, Nagoya; Kaoru Ohashi, Okazaki; Toshio Onuma, Susono; Shuuichi Buma, Toyota, all of Japan

[73] Assignee: Toyota Jidosha Kabushiki Kaisha, Japan

[*] Notice: The portion of the term of this patent subsequent to Mar. 3, 2004 has been disclaimed.

[21] Appl. No.: 812,801

[22] Filed: Dec. 23, 1985

[30] Foreign Application Priority Data

Dec. 25, 1984 [JP] Japan .................................. 59-276515
Dec. 25, 1984 [JP] Japan .................................. 59-276516
Feb. 4, 1985 [JP] Japan .................................. 60-20670

[51] Int. Cl.⁴ .............................................. B60G 17/00
[52] U.S. Cl. .................................................. 280/707
[58] Field of Search ............... 280/707, 708, 709, 711, 280/714, DIG. 1, 6 R, 6 H; 134/299

[56] References Cited

U.S. PATENT DOCUMENTS

| | | | |
|---|---|---|---|
| 2,973,969 | 3/1961 | Thall | 280/709 |
| 3,632,131 | 1/1972 | Engfer | 280/707 |
| 4,162,083 | 7/1979 | Zabler | 280/703 |
| 4,350,354 | 9/1982 | Dotti et al. | 280/6 H |
| 4,396,202 | 8/1983 | Kami | 280/714 |
| 4,540,188 | 9/1985 | Meloche et al. | 280/6 R |
| 4,589,676 | 5/1986 | Meloche et al. | 280/707 |
| 4,593,920 | 6/1986 | Natsume et al. | 280/6 R |
| 4,634,143 | 1/1987 | Asami et al. | 280/707 |

FOREIGN PATENT DOCUMENTS

5631861 8/1979 Japan .
59-23712 2/1984 Japan .
59-63218 4/1984 Japan .

OTHER PUBLICATIONS

(840,258) Mizuguchi, M., *Chassis Electronic Control Systems for the Mitsubishi 1984 Galant,* Society of Automotive Engineers, 3184, 280–707.

*Primary Examiner*—John J. Love
*Assistant Examiner*—Karin L. Ferriter
*Attorney, Agent, or Firm*—Parkhurst & Oliff

[57] ABSTRACT

When a sporadic shock due to a protrusion or sinking of a road surface is detected at front wheels of a vehicle during its cruising on the road surface, the characteristic of the rear wheel suspension of the vehicle is immediately altered to improve the controllability and the stability of the vehicle or the feel of the ride thereof. For that purpose, a height sensor for detecting the distance between the body of the vehicle and each of the right and left front wheels thereof, a judgement section by which a front wheel vehicle height signal generated by the height sensor is compared with a predetermined reference range signal, and a controller for altering the characteristic of the rear wheel suspension of the vehicle depending on the result of the comparison are provided. In addition, a returning control of the characteristic of the suspension to the original state immediately after the rear wheels of the vehicle have passed over the protrusion or sinking which causes a sporadic shock may be performed. More effective control can be performed if these section are provided for the right and left wheels of the front and rear of the vehicle, respectively.

10 Claims, 44 Drawing Figures

(B)

(A)

(B)

(A)

(B)

(A)

(B)

(A)

(B)

(C)

(A)

(B)

(A)

(A)

(B)

REAR WHEEL SUSPENSION CONTROLLER

BACKGROUND OF THE INVENTION

1. Field of the invention

The present invention relates to a rear wheel suspension controller for a vehicle, particularly to a rear wheel suspension controller which is effective against a sporadic shock caused by a protrusion or a sinking of a road surface on which an automobile is running.

2. Prior art

Conventionally, the spring constant, damping force, bush characteristic or stabilizer characteristic of each of various suspension components provided between a body of a vehicle and its wheels is altered under control depending on conditions of a road surface or running conditions of the vehicle in order to prevent the vehicle from being shocked or vibrated and keep the controllability and the stability of the vehicle good. For example, altering the spring constant of the air spring of a suspension depending on conditions of the road surface, altering the damping force of a shock absorber, and simply making the characteristic of a bush or a stabilizer variable were proposed in published unexamined Japanese patent applications No. sho 59-23712 and No. sho 59-26638, in those No. sho 58-30542 and No. sho 59-23712, and in Japanese utility model application No. sho 58-26605 and published unexamined Japanese utility model application No. sho 59-129613, respectively. In such control, when it is detected by a vehicle height sensor that the vehicle is running on a rough road or when it is detected by a brake sensor or an accelerator sensor that the front of the vehicle has gone up or down, the characteristic of each suspension of the vehicle is altered to maintain a good controllability and stability of the vehicle running on the rough road, or to prevent the front of the vehicle from going up or down further. However, under the above-mentioned conventional control, the vehicle is not judged to be running on a rough road, until a large turbulence is continuously detected by the vehicle height sensor. When the vehicle is judged to be running on a rough road, the spring constants of the suspensions for all the wheels of the vehicle or the damping forces of the shock absorbers for all the wheels are increased to produce a desired effect. If the vehicle passes over a joint of road patches or its sporadic protrusion or sinking, the vehicle usually receives only one shock and resumes running on a flat part of the road again, so that the characteristic of each suspension is not altered. For that reason, passengers of the vehicle are not protected from an unpleasant shock due to such sporadic protrusion or sinking, which is different from the case that the vehicle is running on a rough road having continuous protrusions or sinkings. In some cases of passing over such sporadic protrusion or sinking, the controllability and the stability of the vehicle deteriorate as well.

SUMMARY OF THE INVENTION

The first purpose of the present invention is to appropriately control suspensions provided between a body of a vehicle and its rear wheels, to keep the controllability and the stability of the vehicle good and provide passengers of the vehicle with a good feeling of ride.

The second purpose of the present invention is to alter the characteristic of each suspension of a vehicle running over such a sporadic protrusion or sinking of a surface of a road like a joint of road patches to keep the controllability and the stability of the vehicle and the feeling of the ride thereof good.

The third purpose of the present invention is to return the characteristic of each suspension of a vehicle to the original state as soon as the vehicle resumes running on a flat part of a road after passing over a sporadic protrusion or sinking of the road surface, to always control the suspension characteristic appropriate to the conditions of the road surface at any point in time.

The fourth purpose of the present invention is to control the characteristics of the suspensions of a vehicle independently of each other with regard to the right and left wheels of the vehicle in consideration of the fact that the right and left wheels of the vehicle do not always simultaneously pass over a protrusion or sinking of the surface of a road, to more finely keep the controllability and the stability of the vehicle and the feeling of the ride thereof good.

The fifth and last purpose of the present invention is to apply the above-mentioned control not only to one type of suspension but also to other various types of suspensions.

According to the present invention, a rear wheel suspension controller for a vehicle having suspensions between the body of the vehicle and its wheels includes the following means in order to attain the purposes:

(a) front wheel vehicle height detection means by which the distance between the front wheel and the vehicle body is detected as a vehicle height to generate a front wheel vehicle height signal;

(b) judgment means by which the front wheel vehicle height signal is compared with a predetermined reference range signal for generating a judgment result signal when the front wheel vehicle height signal is higher than the predetermined reference range signal; and (c) rear wheel suspension characteristic alteration means for performing control to alter the characteristic of the suspensions of the rear wheels depending on the judgment result signal.

The rear wheel suspension controller may further include a return means for performing control to return the suspension characteristic altered by the rear wheel suspension characteristic alteration means, to the original unaltered state a predetermined time interval after the judgment result signal is generated. The predetermined time interval can be determined in terms of the speed of the vehicle to surely alter the characteristic of each rear wheel suspension until when the rear wheel passes over the sporadic protrusion or sinking of the road surface detected at the front wheel.

The front wheel vehicle height detection means, the judgment means and the rear wheel suspension characteristic alteration means can be independently provided for the right and left front wheels or the right and left rear wheels to control the characteristic of the suspension for the right rear wheel when the sporadic protrusion or sinking of the road surface is detected at the right front wheel, or to control the characteristic of the suspension for the left rear wheel when the sporadic protrusion or sinking is detected at the left front wheel, thus enabling finer control. In that case, the return means can be also independently provided for the right and left wheels.

A displacement of the vehicle height from an average of the vehicle height, a speed of the vehicle height displacement, an acceleration of the vehicle height displacement, or an amplitude of the vibration of the vehicle height can be adopted as the front wheel vehicle height signal.

The rear wheel suspension controller may further include a selection means for putting the controller in operation only when the vehicle is moving or only when the driver of the vehicle wants to put the controller in operation.

The characteristic of each suspension is herein referred to as the spring constant, damping force and/or bush property of the suspension, in the main. When the result of judgment by the judgment means is that the vehicle height is out of a predetermined range, the spring constant, damping force and/or bush property is changed by the right and left rear wheel suspension characteristic alteration means to alter the characteristics of the suspensions of the right and left rear wheels at the same time or independently.

The operations of the means constituting the rear wheel suspension controller according to the present invention are briefly described hereinafter. When a protrusion or sinking of a road surface is found out by the front wheel vehicle height detection means, the degree of the protrusion or sinking is judged by the judgment means. The result of the judgment is applied to the rear wheel suspension characteristic alteration means. If the degree of the protrusion or sinking is high enough to be out of a predetermined range, the vibration at the rear part of the vehicle is reduced or good controllability and stability of the vehicle are maintained by the rear wheel suspension characteristic alteration means.

DETAILED DESCRIPTION OF PREFERRED EMBODIMENTS

Figure 1:
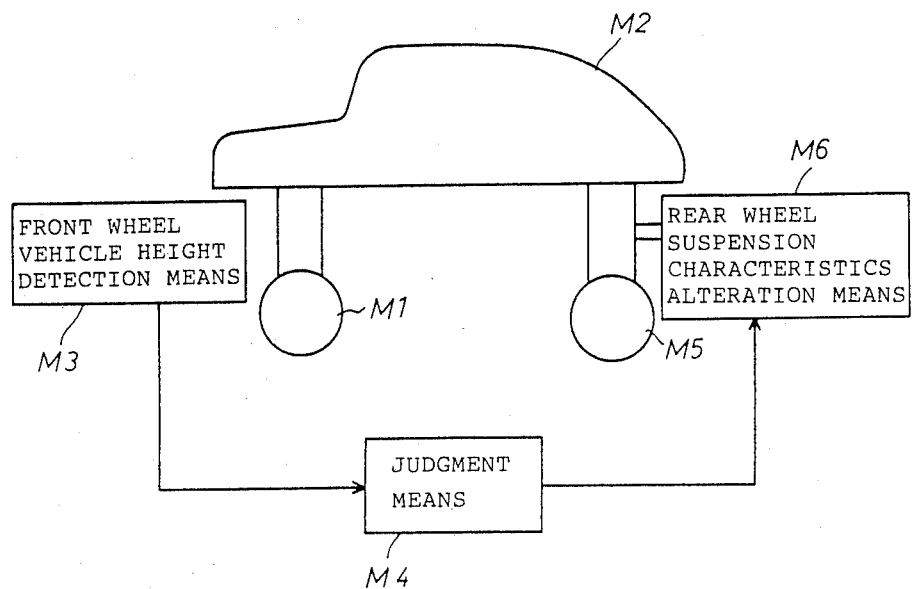
FIG. 1 shows an outline of a constitution of the first embodiment of the present invention.

FIG. 1 shows an outline of a construction of the first embodiment of the present invention. In this embodiment, the distance between a body M2 of an automobile and its front wheel M1 is found out by a front wheel vehicle height detection means M3 for generating a front wheel vehicle height signal and send it to a judgment means M4. The front wheel vehicle height signal is compared with a predetermined reference range signal by the judgment means M4 to generate a judgment result signal and send it to a rear wheel suspension characteristic alteration means M6 for the rear wheels M5 of the vehicle when the front wheel vehicle height signal is higher than the predetermined reference range signal. The spring constant, damping force, bush property, stabilizer property or the like of the rear wheel suspension of the vehicle is changed by the alteration means M6.

Figure 2:
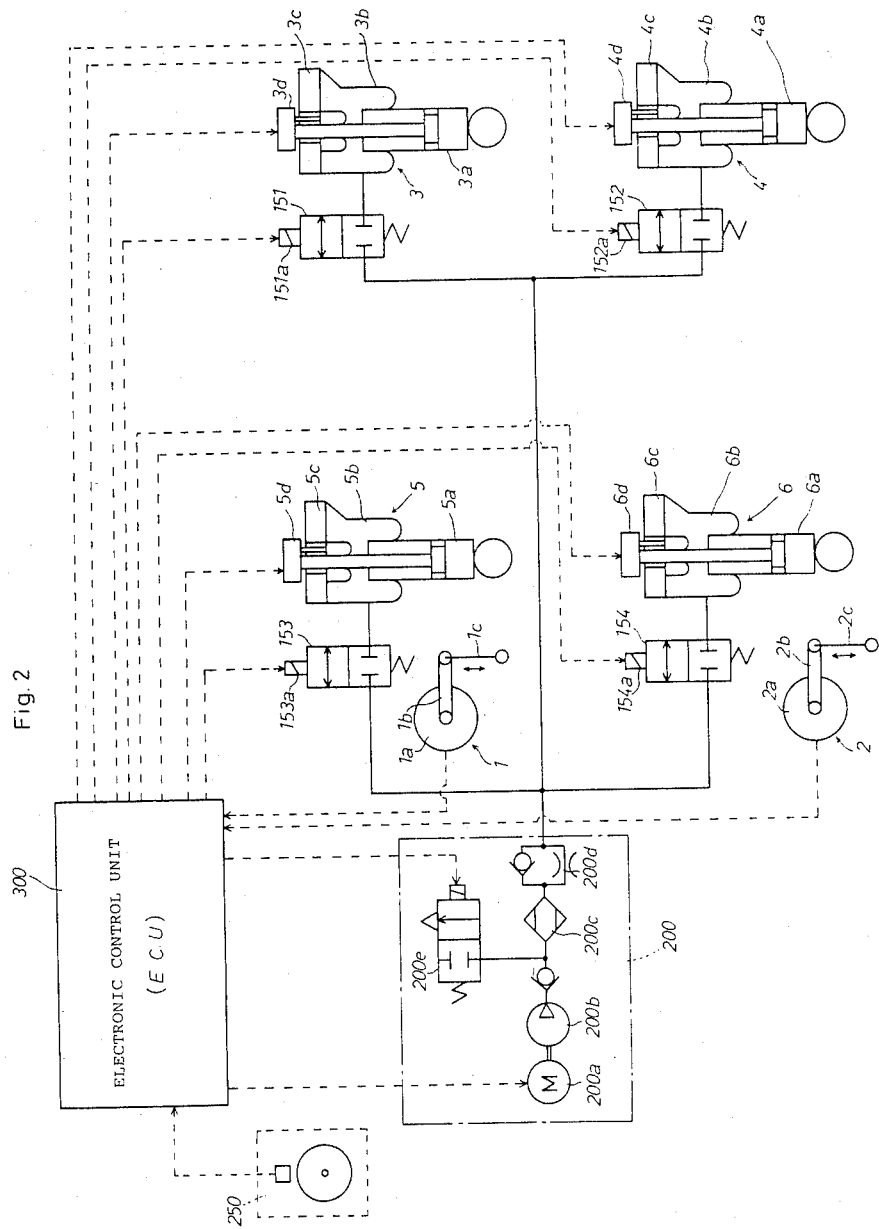
FIG. 2 shows details of the constitution of the first embodiment.

FIG. 2 shows details of the constitution of the first embodiment. A right front wheel vehicle height sensor 1 is provided between the body and right front wheel of the automobile to detect the distance between the automobile body and a right suspension arm, which follows the motion of the wheel. A left front wheel vehicle height sensor 2 is provided between the body and left front wheel of the vehicle to detect the distance between the vehicle body and a left suspension arm. The short cylindrical bodies 1a and 2a of the vehicle height sensors 1 and 2 are secured on the vehicle body. Links 1b and 2b extend from the center shafts of the bodies 1a and 2a almost perpendicularly to the center shafts. Turnbuckles 1c an 2c are rotatably coupled to the ends of the links 1b and 2b opposite the bodies 1a and 2a. The ends of the turnbuckles 1c and 2c opposite the links are rotatably coupled to portions of the suspension arms. A potentiometer, whose electric resistance changes depending on the rotation of the center shaft of the body of each vehicle height sensor to take out the change in the vehicle height in the form of a voltage change, is built in each of the bodies of the vehicle height sensors 1 and 2. Although the vehicle height sensors of the above-mentioned type are used in this embodiment, vehicle height sensors of such other type may be used that plural light interrupters are provided in the body of each sensor, and a disk having a slit coaxial with the center shaft of the sensor turns on or off th light interrupters depending on the change in the vehicle height to detect the height. FIG. 2 also shows an air suspension 3 which is provided between the suspension arm (not shown in the drawings) for the right rear wheel of the vehicle and the body thereof and extends in parallel with a suspension spring (not shown in the drawings). The air suspension 3 includes a shock absorber 3a, a main air chamber 3b, an auxiliary air chamber 3c and an actuator 3d in the main, and has a spring function, a vehicle height adjustment function and a shock absorber function. The same air suspensions 4, 5 and 6 are provided for the left rear wheel, right front wheel and left front wheel of the vehicle, respectively.

FIGS. 3(A) and 3(B) show a construction of the main part of the air suspension 3. FIG. 3(B) shows a sectional view along a line X1—X1 shown in FIG. 3(A). The other air suspensions 4, 5 and 6 have the same construction as the suspension 3. The air suspension 3 includes a conventional shock absorber 3a composed of a piston and a cylinder, and an air spring unit 14 provided in conjunction with the shock absorber. An axle (not shown) is supported at the lower end of the cylinder 12a of the shock absorber 3a. An elastic cylindrical assembly 18 for elastically supporting a piston rod 12b to the vehicle body 16 is provided at the upper end of the piston rod 12b extending from the piston (not shown) slidably fitted in the cylinder 12a. The shock absorber 3a is a conventional buffer whose damping force can be varied for adjustment by operating the valve function of the piston. A control rod 20 for adjusting the damping force is liquid-tightly and rotatably fitted with a sealing member 22 in the piston rod 12b.

The air spring unit 14 has a chamber 32 which is defined by a circumferential member 26 comprising a bottom 26a probided with an opening 24, through which the piston rod 12b is allowed to extend, and a wall 26b rising from the peripheral portion of the bottom 26a, an upper housing member 28a covering the circumferential member 26 and secured on the vehicle body, a lower housing member 28b open at the lower end and coupled to the lower end of the upper housing member 28a, and a diaphragm 30 made of an elastic material and closing the lower end of the lower housing member 28b. The chamber 32 is divided into a lower main air chamber 3b and an upper auxiliary air chamber 3c by a partition member 36 secured on the bottom 26a of the circumferential member 26 and having an opening 34 corresponding to the opening 24 provided in the bottom 26a. Both the chambers 3b and 3c are filled with compressed air. The partition member 36 is fitted with a conventional buffer rubber 40 which can be brought into contact with upper end of the cylinder 12a. The buffer rubber 40 has a passage 42 for connecting the openings 24 and 34 to the main air chamber 3b.

The elastic cylindrical assembly 18 is disposed inside the circumferential member 26 whose wall 26b defines the inside circumferential surface of the auxiliary air chamber 3c, in such manner that the assembly 18 surrounds the piston rod 12b. The cylindrical elastic assembly 18 is provided with a valve unit 44 for controlling the communication of both the air chambers 3b and 3c. The assembly 18 includes an outer cylinder 18a, a cylindrical elastic member 18b and an inner cylinder 18c which are disposed concentrically to each other. The cylindrical elastic member 18b is secured on both the cylinders 18a and 18b. The outer cylinder 18a of the assembly 18 is press-fitted on the wall 26b of the circumferential member 26 secured on the vehicle body, under the action of the upper housing member 28a. The valve casing 44a of the valve unit 44, through which the piston rod 12b is allowed to extend, is secured on the inner cylinder 18c. Since the piston rod 12b is secured on the valve casing 44a, the piston rod is elastically supported to the vehicle body by the cylindrical elastic assembly 18. An annular air sealing member 46 is tightly packed in between the outer cylinder 18a and the bottom 26b of the member 26. An annular air sealing member 48 is tightly packed in between the piston rod 12b and the valve casing 44a. An annular air sealing member 50 is tightly packed in between the inner cylinder 18c and the valve casing 44a.

The valve casing 44a has a hole 52 which is open at both the ends and extends in parallel with the piston rod 12b. A rotary valve 44b is rotatably supported in the hole 52. The valve 44b includes a main portion 56a, which can be brought into contact with a lower positioning ring 54a provided at the lower end of the hole 52, and a small-diameter operating portion 56b projecting from the main portion above the elastic cylindrical assembly 18. An upper positioning ring 54b, which cooperates with the lower positioning ring 54a to prevent the valve 44b from dropping out of the hole 52, is provided at the upper end of the hole 52. An annular sealing base 60 holding an inner air sealing member 58a and an outer air sealing member 58b for tightly closing the hole 52 is provided between the upper positioning ring 54b and the main portion 56a of the valve 44b. A friction reducer 62 for smoothing the rotative motion of the valve 44b when the main portion 56a of the valve is pushed to the sealing base 60 by air pressure is provided between the sealing base and the main portion of the valve.

A chamber 64, which communicates with the main air chamber 3b through the openings 24 and 34 and the passage 42 of the buffer rubber 40, is formed in the lower portion of the elastic cylindrical assembly 18. The main portion 56a of the valve 44b has a recess 66 open to the chamber 64, and has a communication passage 68 extending through the main portion 56a in a diameter direction thereof across the recess 66.

Figure 3:
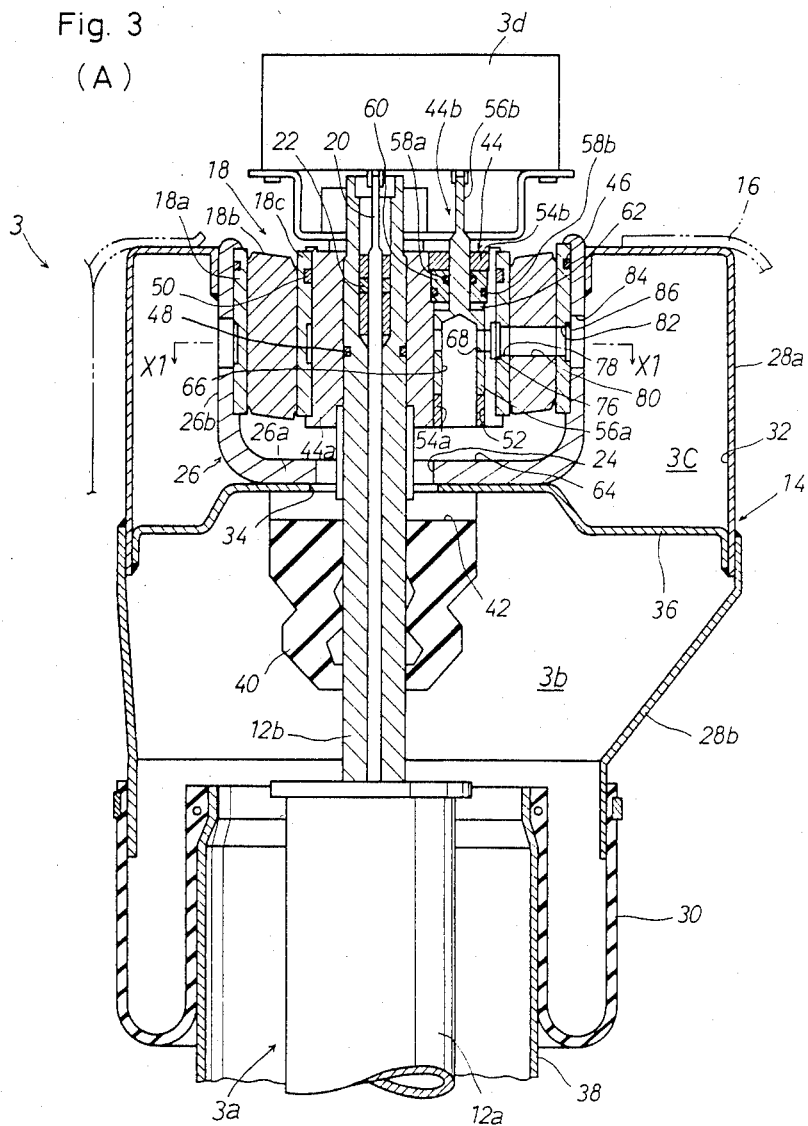
FIG. 3(A) shows a sectional view of a main part of an air suspension.
FIG. 3(B) shows a sectional view along a line X1—X1 shown in FIG. 3(A).
Figure 3:
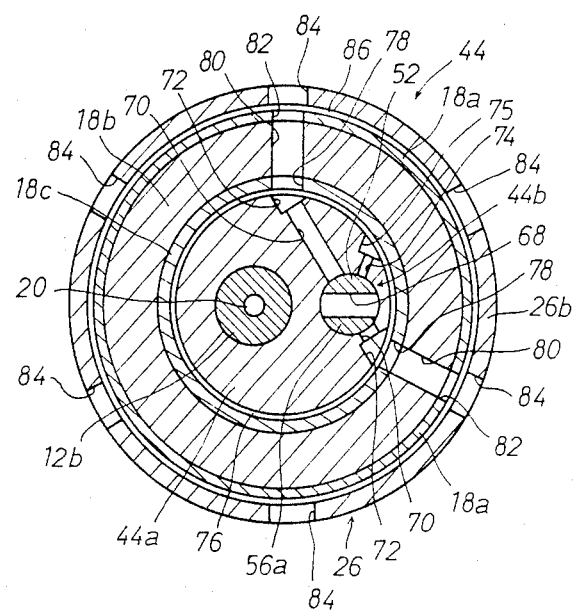

The valve casing 44a, which houses the valve 44b, has a pair of air passages 70, each of which can communicate at one end with the communication passage 68, as shown in FIG. 3 (B). The air passages 70 extend on almost the same plane outwards in a diametral direction of the hole 52, toward the peripheral surface of the valve 44b. The other end of each air passage 70 is open to the peripheral surface of the valve casing 44a through a face hole 72. An air passage 74, which can communicate at one end with the communication passage 68, extends on almost the same place as the pair of air passages 70 toward the peripheral surface of the valve casing 44a, between the pair of air passages 70 outside the hole 52. The diameter of the air passage 74 is smaller than that of each of the air passages 70. The other end of the air passage 74 is open to the peripheral surface of the valve casing 44a through a face hole 75. The inside circumferential surface of the inner cylinder 18c covering the peripheral surface of the valve casing 44a has an annular recess 76 which surrounds the peripheral surface of the valve casing to connect the face holes 72 and 75 for the air passages 70 and 74 to each other.

The inner cylinder 18c has an opening 78 which extends continuously to the recess 76 which constitutes an annular air passage. The cylindrical elastic member 18b has through holes 80, which extend outwards in the radial direction of the member 18b correspondingly to the openings 78. The through holes 80 are made open to the peripheral surface of the outer cylinder 18a through the openings 82 of the cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a are provided with plural openings 84 which are located at equal intervals in the circumferential direction of the member 26 and extend continuously to the auxiliary air chamber 3c to connect the openings 78 and 82 and the through holes 80 to the auxiliary air chamber 3c. The peripheral surface of the outer cylinder 18a is provided with an annular recess 86 which surrounds the outer cylinder at the openings 82 to connect the openings 84, 78 and 82 and the through holes 80 to each other. The openings 84 extend continuously to the recess 86 constituting an annular air passage.

Although the openings 78 and 82 and the through holes 80 are provided correspondingly to the two air passages 70 of the valve casing 44a in the embodiment shown in FIG. 3(B), the air passages 70 and 74 can be provided in optional positions in the circumferential direction of the elastic member 18b because the annular air passage 76, with which the air passages 70 and 74 communicate, is formed between the inner cylinder 18c and the valve casing 44a.

A control rod 20 for adjusting the damping force of the shock absorber 3a, and a conventional actuator 3d for rotating the valve 44b of the valve unit 44, are provided at the upper end of the piston rod 12b, as shown FIG. 3(A).

Since the air suspension 3 has the above-mentioned construction, the air suspension performs actions described hereinafter. When the valve 44b is kept in such a closed position shown in FIG. 3(B) that the communication passage 68 of the valve does not communicate with any of the air passages 70 and 74 of the valve casing 44a, the main air chamber 3b and the auxiliary air chamber 3c are disconnected from each other so that the spring constant of the suspension 3 is set at a large value. When the actuator 3d has rotated the valve 44b into such a position that the communication passage 68 of the valve communicates with the large-diameter air passages 70 of the valve casing 44a, the main air chamber 3b is connected to the auxiliary air chamber 3c through the communication passage 68 communicating with the main air chamber, the large-diameter air passages 70 and the openings 78 and through holes 80 of the elastic assembly 18 and the openings 82 and 84, so that the spring constant of the suspension 3 is set at a small value. When the valve 44b is rotated into such a position by the regulated actuator 3d that the communication passage 68 of the valve communicates with the small-diameter communication passage 74 of the valve casing 44a, the main air chamber 3b is connected to the auxiliary air chamber 3c through the communication passage 68 communicating with the main air chamber, the small-diameter air passage 74, the air passage 76, the openings 78 and through holes 80 of the elastic assembly 18 and the openings 82 and 84, so that the spring constant of the suspension 3 is set at an intermediate value because the small-diameter air passage 74 provides a higher air flow resistance than the large-diameter air passages 70.

Leveling valves 151–154 are provided for the air suspensions 3–6, respectively, as shown in FIG. 2. A compressed air feed and discharge system 200, which is described below, is connected to or disconnected from the main air chambers 3b–6b of the air suspensions 3 6 by the leveling valves 151–154 depending on whether electricity is supplied to solenoids 151a–154a or not. When the leveling valves 151–154 are opened, compressed air is fed to the air suspensions, the height of the vehicle is increased. If the compressed air is discharged from the air suspensions, the height of the vehicle is decreased. When the leveling valve 151–154 are closed, the height of the vehicle is maintained.

In the compressed air feed and discharge system 200, a compressor 200b is driven by a motor 200a to produce the compres air. An air drier 200c dries the compressed air to be fed to the air suspensions 3–6, in order to protect pipes and the parts of the air suspensions from moisture of the compressed air and in order to prevent the pressure change in the main air chambers 3b–6b and auxiliary air chambers 3c–6c of the air suspensions caused by the phase change of the water vapor. When the compressed air is fed to the air suspensions, a check valve 200d provided with a fixed orifice is opened. When the compressed air is discharged from the air suspensions, the check valve 200d is closed so that the air flows out through only the fixed orifice. When the compressed air is discharged from the air suspensions 3–6, a releasing solenoid valve 200e is driven so that the compressed air discharged from the air suspensions through the fixed orifice at the check valve 200d and through the air drier 200c is released into the atomosphere. The solenoid valve 200e can be regulated to change the volume of each of the main air chambers of the air suspensions 3–6 to adjust the height of the vehicle.

A vehicle speed sensor 250 is provided in a speedometer, for example, so that the sensor sends out a pulse signal corresponding to the speed of the vehicle, in response to the motion of the axle of the vehicle.

Figure 4:
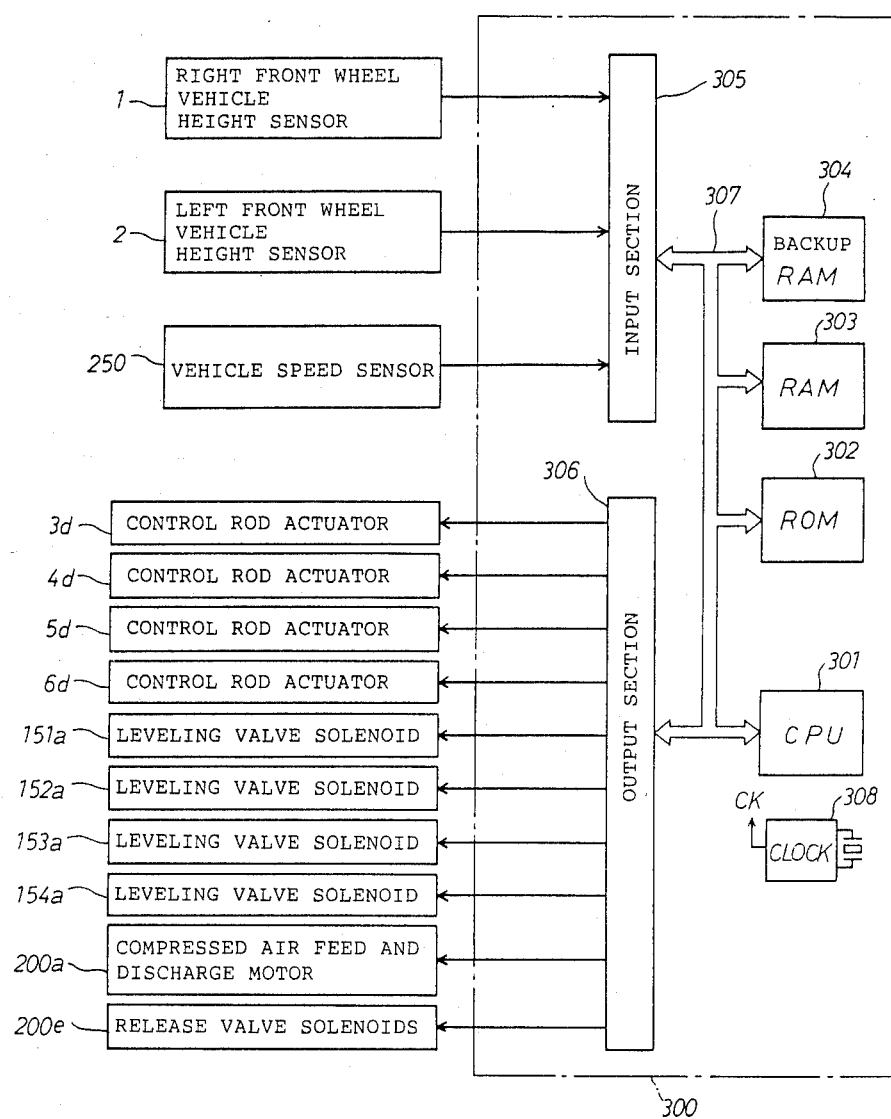
FIG. 4 shows a construction of an electronic control unit (ECU).

The output signals of the vehicle height sensors 1 and 2 and the vehicle speed sensor 250 are entered into an electronic control unit (hereinafter referred to as ECU) 300, which processes these signals to send out drive signals to the actuators 3d–6d of the air suspensions 3–6, the leveling valves 151–154, the motor 200a of the compressed air feed and discharge system 200 and the solenoid valve 200e to perform appropriate control if necessary. FIG. 4 shows the construction of the ECU 300. A central processing unit (hereinafter referred to as CPU) 301 receives the output data from the sensors and performs operations on the data, in accordance with a control program, to carry out processing steps for the control of various units or means or the like. The control program and initial data are stored in a readonly memory (hereinafter referred to as ROM) 302. The data, which are entered in the ECU 300, and data necessary for operations and control, are stored into and read our of a random-access memory (hereinafter referred to as RAM) 303. A backup random-access memory (hereinafter referred to as backup RAM) 304 is backed up by a battery so that even if the ignition key switch of the automobile is turned off, the backup RAM retains data which are needed after the turning-off of the switch. An input section 305 includes an input port not shown in the drawings, a waveshaping circuit provided if necessary, a multiplexer which selectively sends out the output signals of the sensors to the CPU 301, and an A/D converter which changes an analog signal into a digital signal. An output section 306 includes an output port not shown in the drawings, and a drive circuit for driving the actuators according to the control signals of the CPU 301 as occasion demands. A bus 307 connects circuit components such as the CPU 301 and the ROM 302, the input section 305 and the output section 306 to each other to transmit data. A clock circuit 308 sends out a clock signal at prescribed intervals to the CPU 301, the ROM 302, the RAM 303 and so forth so that a control timing is set by the clock signal.

Figure 5:
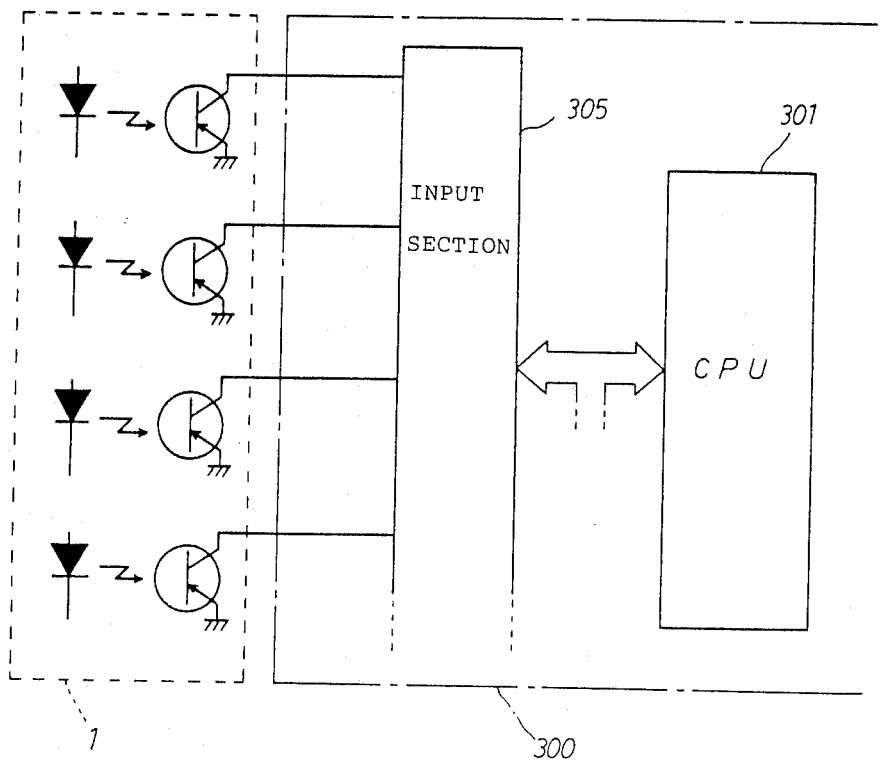
FIG. 5(A) shows a construction of an input section which receives a digital front wheel vehicle height signal.
FIG. 5(B) shows a construcion of an input section which receives an analog front wheel vehicle height signal.
Figure 5:
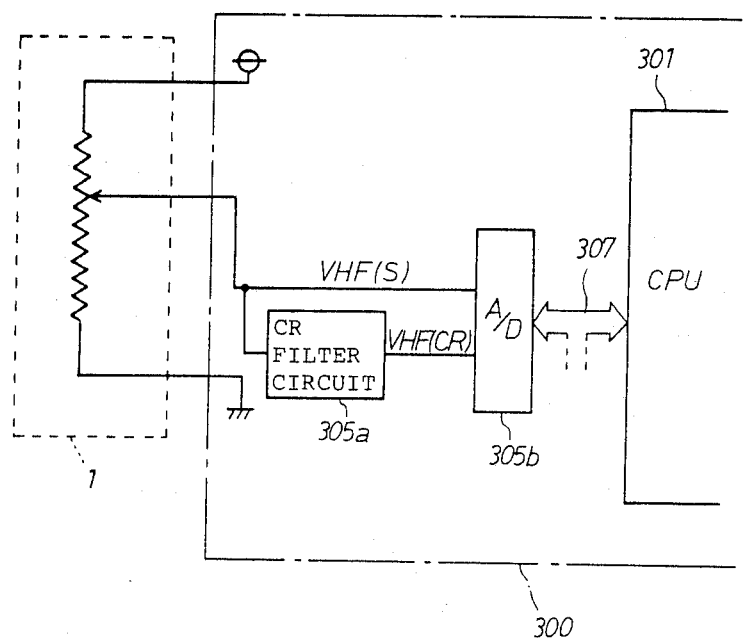

If the output signal of the vehicle height sensor 1 is a digital signal, the signal is transmitted to the CPU 301 through the input section 305 including a buffer as shown in FIG. 5(A). If the output signal of the vehicle height sensor 1 is an analog signal, a construction as shown in FIG. 5(B) is provided. In the latter case, the vehicle height sensor 1 sends out the analog signal of a voltage corresponding to the height of the vehicle. The analog voltage signal is converted into a voltage VHF(CR) indicating an average height of the vehicle, by a CR filter circuit 305a made of a low-pass filter. The voltage VHF(CR) is applied to an A/D converter 305b. The analog voltage signal is also directly applied as a voltage VHF(S) indicating the current height of the vehicle, to the A/D converter 305b. The converter 305b changes both the input signals into digital signals through the action of a multiplexer. The digital signals are transmitted from the converter the CPU 301. The same thing applies to the left front wheel vehicle height sensor 2.

The processing steps, which are performed by the ECU 300, are hereinafter described referring to a flow chart shown in FIG. 6. The flow chart indicates the processing steps performed by the ECU 300 in response to the vehicle height sensor 1 of the linear type which sends out the analog signal, as shown in FIG. 5(B). The processing steps are repeatedly performed in every predetermined time intervals, such as 5 msec. The outline of the processing steps shown in the flow chart is described as follows:

(1) A current vehicle height VHF(S) and an average vehicle height VHF(CR) are determined (Steps 540 and 550).

(2) It is judged whether or not the current vehicle height has displaced more than a predetermined value h0 from the average vehicle height (Step 580).

(3) If the current vehicle height is judged to have displaced more than the predetermined value h0 from the average vehicle height, the characteristic of each of the suspensions for the rear wheels is altered to deal with passing over the protrusion or sinking of the road surface (Step 620). For example, under such driving condition of the vehicle that the rear portion, in particular, of the vehicle needs to be prevented from being shocked, the characteristic of each of the suspensions for the rear wheels is made 'soft', in other words, the actuators 3d and 4d are operated to connect the main air chambers 3b and 4b and auxiliary air chambers 3c and 4c of the air suspensions 3 and 4 to each other to decrease the spring constants of the air springs of the suspensions or reduce the damping forces of the shock asborbers 3a and 4a. In contrast with that, under such driving condition of the vehicle that the controllability and the stability of the vehicle need to be considered more important than the feeling of ride of the vehicle, the characteristic of each rear wheel suspension is made 'hard', in other words, the main air chambers 3b and 4b and auxiliary air chambers 3c and 4c of the air suspensions 3 and 4 are disconnected from each other to increase the spring constants or augment the damping forces.

The above-mentioned operations (1), (2) and (3) correspond to the main processing steps for producing the effect of the present invention, and still another operation (4) mentioned below is added to the main operations (1), (2) and (3) in the embodiment.

(4) Subsequently to the operation (3), the characteristic of each rear wheel suspension is returned to the original state after the rear wheels have passed over the protrusion or sinking of the road surface (Step 660).

The details of the processing steps are hereinafter described. The processing steps are repeatedly performed in every 5 msec. It is firstly judged whether or not the processing steps are being performed for the first time since the activation of the ECU 300 (Step 510). If the processing steps are judged to be being performed for the first time, initial setting is effected (Step 520), all variables are cleared and all flags are reset. After the initial setting is effected (Step 520) or if the processing steps in the routine are judged to be being performed for the second time or later, the speed V of the vehicle is detected (Step 530), in terms of the output signal of the vehicle speed sensor 250. A current vehicle height VHF(S) is then detected (Step 540). To detect the current vehicle height, either of the outputs of the vehicle height sensors for the right and left front wheels of the vehicle may be used. Since rear wheels receive a shock whichever of the front wheels has moved up or down due to the protrusion or sinking of the road surface, the average of the outputs of both the vehicle height sensors for the front wheels may be used or the larger one of the outputs may be used. An average of the past outputs of the vehicle height sensor 1 is determined to set an average vehicle height (Step 550). In this embodiment, the average vehicle height VHF(CR) is directly determined from the output signal of the vehicle height sensor 1 through the CR filter circuit 305a which is a the low-pass filter, as shown in FIG. 5(B). If the vehicle height sensor 1 is sending out the digital signal, the average vehicle height may be calculated from past vehicle heights VHF(S) measured in the ECU 300. For example, the calculation can be effected by adopting processing steps shown in FIG. 7, instead of adopting the processing steps in Steps 540 and 550 shown in FIG. 6. In the processing steps shown in FIG. 7, the current vehicle height VHF(S)n is detected first (Step 710), and the average VHFa,n of the vehicle height is then calculated (Steps 730 and 740) in every predetermined operation unit time interval tms (step 720). In Step 730, the following calculation is performed:

$$VHFa,n = \{(k-1)VHFa,n-1 + VHFb,n+1 + VHF(S)n\}/k$$

k: Number of measured values to be averaged

VHFa,n: Average to be calculated currently (n-th time)

VHFa,n−1: Average calculated previously ((n−1)-th time)

VHF(S)n: Measured value of current vehicle height

VHFb,n−1: Value calculated previously for convenience to calculate the average VHFa,n.

In Step 740, the value VHFb,n is calculated as follows:

$$VHFb,n = mod(k)\{(k-1)VHFa,n-1 + VHFb,n-1 + VHF(S)n\}$$

In such calculation, mod(A){B} means the value of the remainder in the division of B by A. The processing steps in Steps 730 and 740 constitute such a single method that a value approximate to the average can be calculated if only the values VHFa,n, vHFa,n−1 and VHFb,n−1 are stored in a memory beforehand. As for the simple method, past (k−1) pieces of data do not need to be stored in the memory, so that the space of the memory and the time of the calculation are saved. If the space of the memory and the time of the calculation are enough for use, a required number of measured values may be averaged normally.

Figure 6:
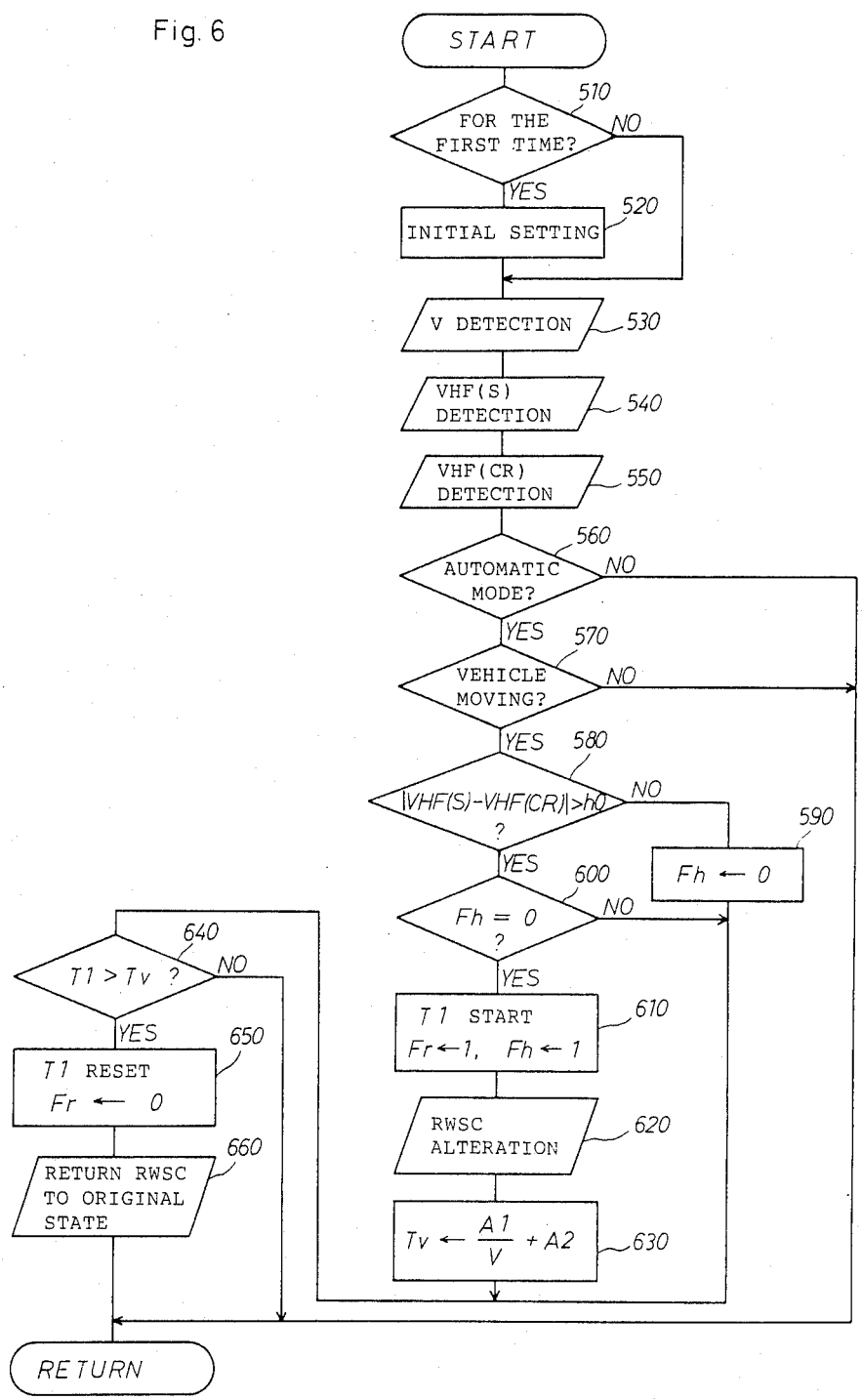
FIG. 6 shows a flow chart of processing steps which are performed in the ECU of the first embodiment.
Figure 7:
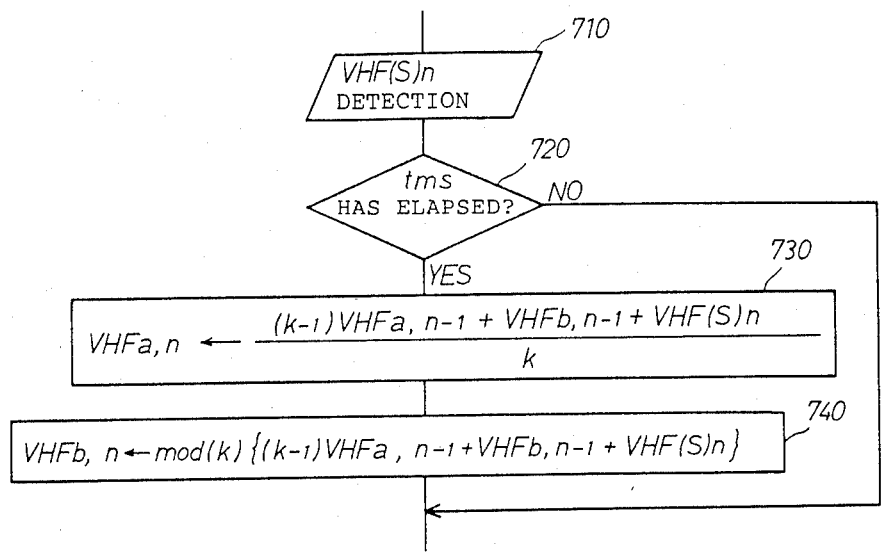
FIG. 7 shows a flow chart of some of the processing steps, which are for calculating an average value of the vehicle height signal.
Figure 8:
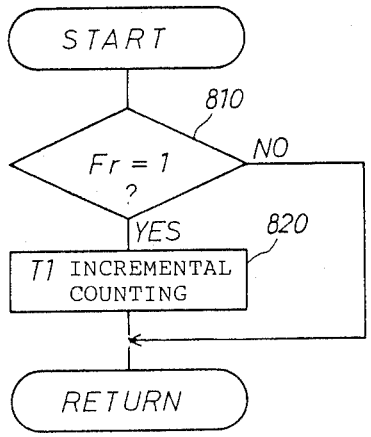
FIG. 8 shows a flow chart of some of the processing steps, which correspond to an incremental counting of a timer.

After the detection of the average (Step 550) as shown in FIG. 6, it is judged (Step 560) whether or not the control of each suspension is in an automatic mode. If the driver of the vehicle has not selected the automatic mode by a manual switch, the processing steps in the routine are terminated. If he has selected the automatic mode, it is judted (Step 570) whether or not the vehicle is moving. When the detected output of the vehicle speed sensor 250 is not lower than a predetermined level, the vehicle is judged to be moving. If the vehicle is judged to be moving, it is then judged (Step 580) whether or not the absolute displacement |VHF(S)−VHF(CR)| of the current vehicle height VHF(S) from the average vehicle height VHF(CR) has exceeded a predetermined value h0. If the displacement is judged to be not larger than the predetermined value h0, a flag Fh is reset (Step 590). The flag Fh is for finding out the first processing steps to be being performed since the displacement exceeded the value h0. If the displacement is judged to have exceeded the predetermined value h0, a timer T1 is started and flags Fr and Fh are set. The timer T1 is for counting up the time for which the characteristic of each rear wheel suspension is kept altered. The flag Fr is for determining whether or not the time T1 should be counting, as shown in FIG. 8 which shows a flow chart indicating a routine which is repeatedly executed in every predetermined time interval. If the flag Fr is already set (Step 810), the timer T1 is caused to perform incremental counting (Step 820).

After Step 610 shown in FIG. 6, the characteristic of each rear wheel suspension is altered (Step 620). For this alteration, the CPU 301 sends out a signal to the actuators 3d and 4d to rotate the valves 44b to connect the main air chambers 3b and 4b and auxiliary air chambers 3c and 4c of the air suspensions 3 and 4 to each other to make the characteristic of each rear wheel suspension 'soft' or decrease the spring constant thereof. As a result, the shock at each rear wheel is absorbed. If the main and the auxiliary air chambers are already connected with each other as the vehicle is running, the valves 44b may be rotated so that the main and the auxiliary air chambers are disconnected. In that case, the characteristic of each rear wheel suspension is altered from 'soft' to 'hard' (large spring constant) to enhance the controllability and the stability of the vehicle.

After the alteration of the rear wheel suspension characteristics (Step 620), the time interval Tv from the detection of the protrusion or sinking of the road surface at the front wheel to the passing of the rear wheel over the protrusion or sinking is calculated on the basis of the vehicle speed V as follows:

$$Tv = (A1/V) + A2$$

A1: Wheelbase
A2: Compensatory term (constant)

The compensatory term A2 is determined in consideration of the detection lags of the vehicle height sensors 1 and 2, the time taken for the rear wheel to pass over the protrusion or sinking of the road surface.

It is judged (Step 640) through comparison with the count of the timer T1 whether or not the time interval Tv determined in Step 630 has elapsed since the alteration of the characteristic of each rear wheel suspension. If the count of the timer T1 is judges to be not larger than the time interval Tv, the processing steps in the routine are terminated as they are. If the count of the timer T1 is judged to have exceeded the time interval Tv, in other words, if the time interval Tv has elapsed since the characteristic of each rear wheel suspension was altered to be appropriate to the protrusion or sinking of the road surface, the timer T1 is reset, and the flag Fr is reset (Step 650). For that reason 'NO' is taken in Step 810, which is for the processing step on the incremental counting of the timer T1 as shown in FIG. 8, in the set state of the flag Fr, so that the incremental counting of the timer is stopped.

Finally, the processing steps for returning the characteristic of each rear wheel suspension to the original state is performed (Step 660). At that time, if the main air chambers 3b and 4b and auxiliary air chambers 3c and 4c of the air suspensions 3 and 4 have been connected to each other to prevent the rear portion of the vehicle from being shocked, the air passages between these air chambers are closed by rotating the valves 44b. If the main and the auxiliary air chambers have been disconnected from each other because the controllability and the stability of the vehicle are considered more important, the air passages between these air chambers are opened by rotating the valves 44b to connect the chambers to each other again. THus, when the protrusion or sinking of the road surface is detected at the front wheel, the characteristic of the rear wheel suspension is altered to prevent the rear portion of the vehicle and the vicinity from being shock or to maintain the good controllability and stability of the vehicle. When the vehicle has passed over the protrusion or sinking, the characteristic of the suspension is returned to the original state.

Figure 9:
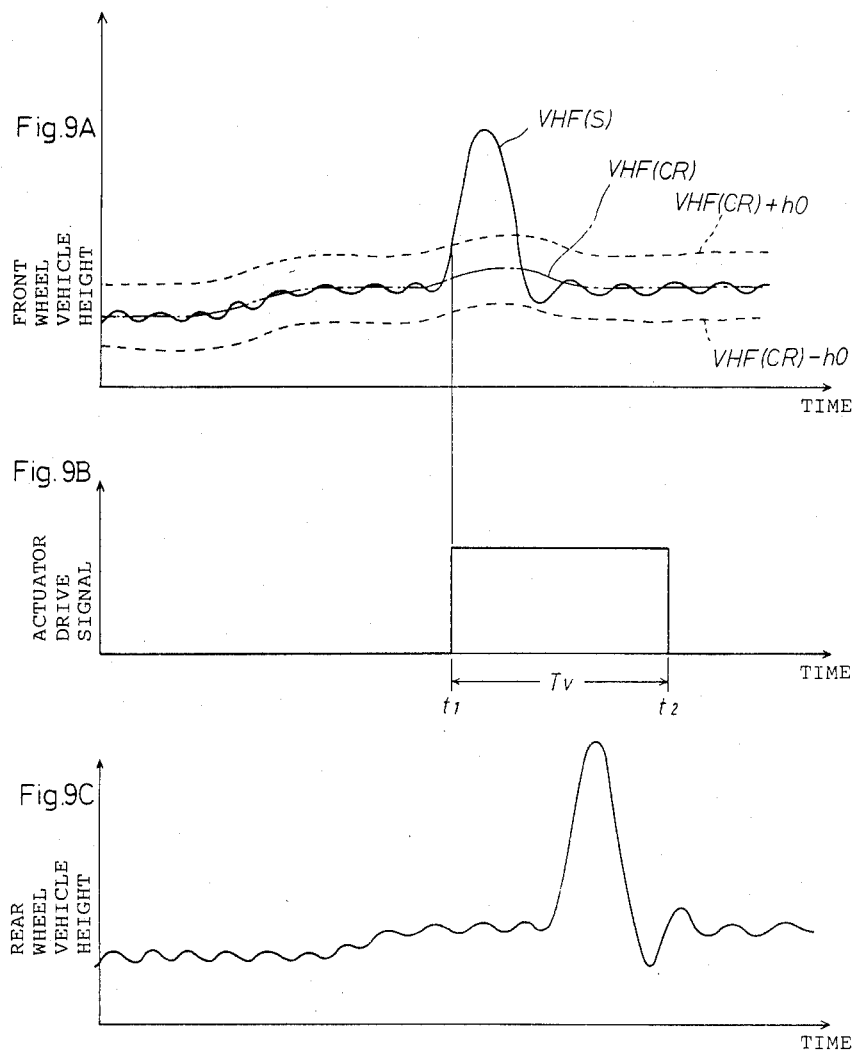
FIG. 9(A)–(C) shows time charts in relation to the processing steps of FIG. 6.

FIG. 9 shows time charts of the processing steps for the above-mentioned alteration and returning of each rear wheel suspension characteristic. Before a time point t1 shown in FIG. 9, the automobile is running on a flat part of the road surface, the vehicle height VHF(S) obtained from the vehicle height sensors 1 and 2 draws waves of small amplitude, and an average vehicle height VHF(CR) obtained from the CR filter circuit 305a draws a smoothed form of the waves. When the front wheel begins to move down into the sinking of the road surface, the vehicle height VHF(S) sharply increases. At the time point t1, the vehicle height VHF(S) exceeds VHF(CR)+h0, in other words, it is judged in Step 580 in the flow chart shown in FIG. 6 that |VHF(S)−VHF(CR| is greater than h0. At the time point t1, the electronic ECU 300 starts sending out the drive signal to the actuators 3d and 4d to operate the valves 44b in the air passages of the air suspensions 3 and 4. As the drive signal is being sent out to the actuators, the valves 44b are opened so that the main air chambers 3b and 4b are connected to the auxiliary air chambers 3c and 4c. At a time point t2 which is by the time interval Tv later than the time point t1, the sending-out of the drive signal is stopped so that the valves 44b are closed. Between the time points t1 and t2, the rear wheel moves down into the sinking detected at the front wheel. If different drive signals for opening and closing the valves 44b, respectively, are sent out to the actuators 3d and 4d, the opening drive signal is sent out at the time point t1 and the closing drive signal is sent out at the other time t2. If the rear wheel moves up on the protrusion of the road surface, the vehicle height draws the deepest wave trough. When the current vehicle height VHF(S) has become less than |VHF(CR)−h0| the actuators 3d and 4d are driven.

In this embodiment, the main air chambers 3b and 4b are connected to the auxiliary air chambers 3c and 4c when the wheels move down into the sinking of the road surface, to prevent the vehicle from being shocked. For that reason, a vehicle height amplitude at the rear wheel is larger than that of the normal running state. If the controllability and stability of the vehicle are aimed to keep good, the vehicle height amplitude at the rear wheel is smaller than that of the normal running state by disconnecting the main and the auxiliary air chambers from each other.

Since this embodiment has the above-mentioned constitution, the good controllability and stability of the vehicle can be maintained or the rear portion of the vehicle can be prevented from being shocked. The shock of the rear wheel would impart an unpleasant vibration not only to the rear seat of the vehicle but also to its front seat. Therefore, the absorption of the shock of the rear wheels results not only in keeping the whole vehicle from being shocked, but also in improving the feeling of the ride of the vehicle. Since the characteristic of each rear wheel suspension is not unclearly altered but is set in distinct states for the normal running of the vehicle and its running over the protrusion or sinking of the road surface, respectively, the controllability and stability and the feeling of the ride in the normal running of the vehicle are simultaneously improved as well as those in the running over the protrusion or sinking. In addition, the degree of freedom of design of the suspension characteristics is increased.

Figure 10:
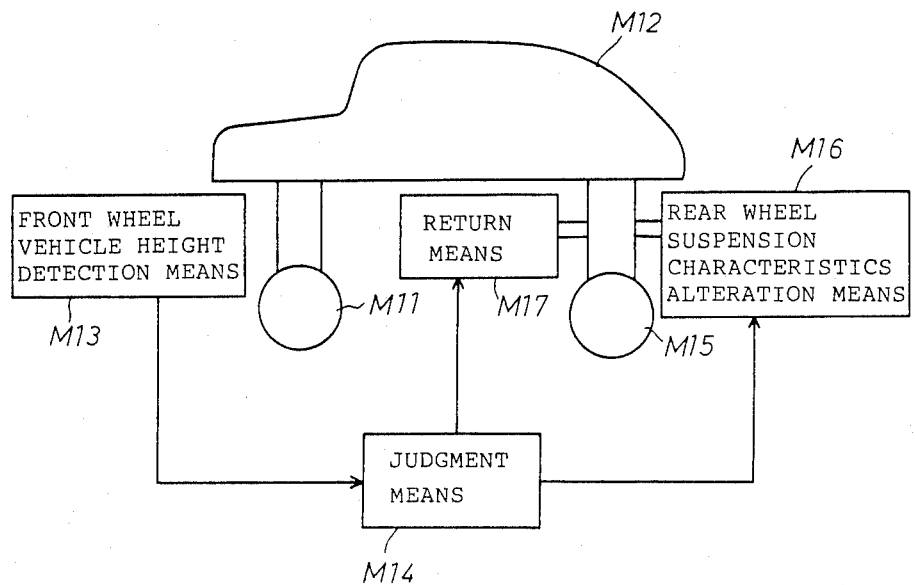
FIG. 10 shows an outline of a constitution of the second embodiment of the present invention.

The second embodiment of the present invention is hereinafter described. FIG. 10 shows an outline of a constitution of the second embodiment. In this embodiment, front wheels M11, a vehicle body M12, front wheel vehicle height detection means M13, judgment means M14, rear wheels M15 and rear wheel suspension characteristic alteration means M16 are provided for the same construction and action as the first embodiment. However, a return means M17 is provided further in the second embodiment to perform such control that the rear wheel suspension characteristics changed by the alteration means M16 when the front wheel M11 has passed over the protrusion or sinking of the road surface is returned to the original state after the rear wheel M15 passes over the protrusion or sinking.

Figure 11:
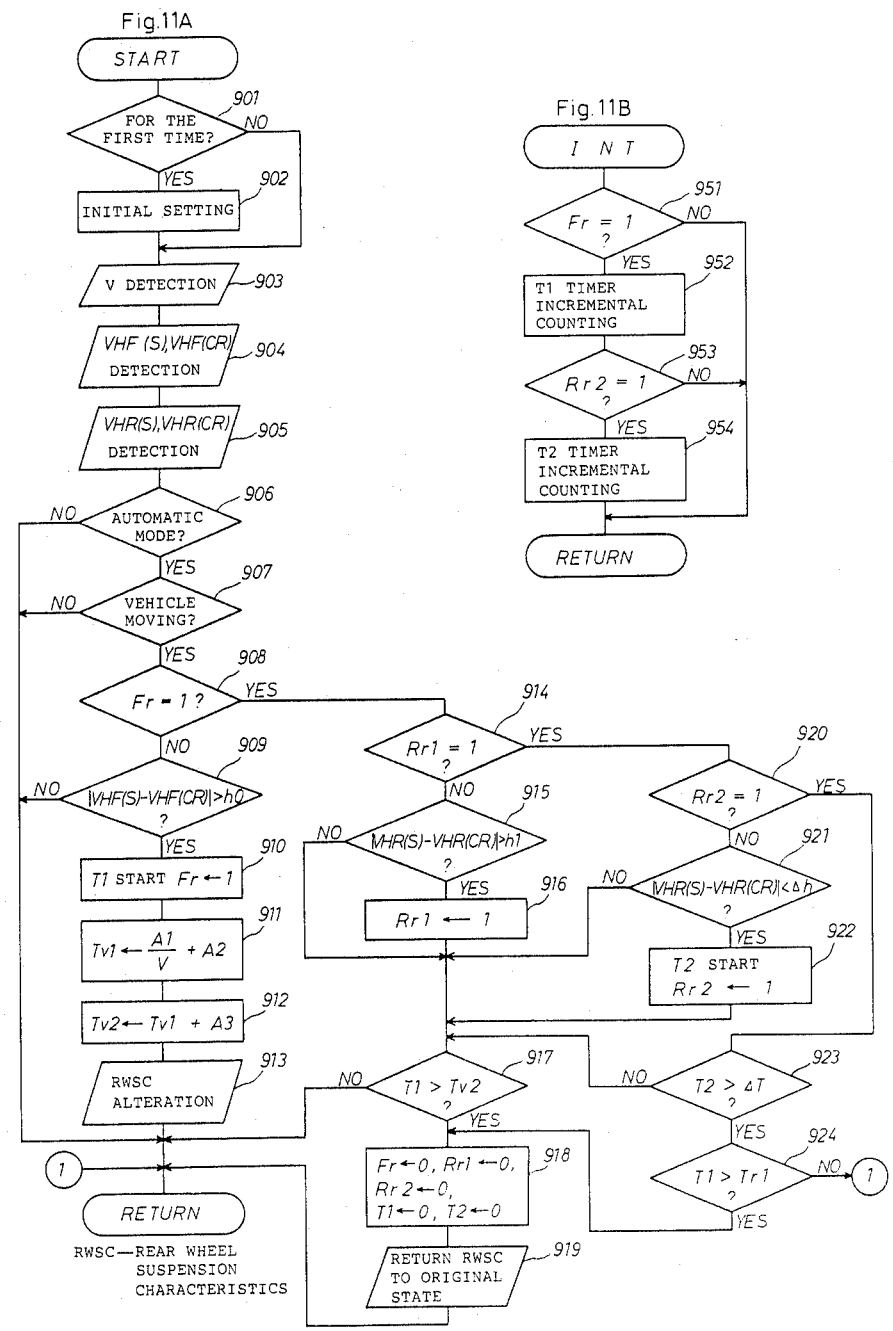
FIG. 11(A) shows a flow chart of processing steps which are performed in the ECU of the second embodiment.
FIG. 11(B) shows a flow chart of some of the processing steps, which correspond to an incremental counting of a timer.

The second embodiment is described in detail below. Though the constitution of the units of the second embodiment is almost the same as the first embodiment, vehicle height sensors are provided for the rear wheels as well as the front wheels in the second embodiment. The distance between the vehicle body M12 and the rear wheel M15 is detected as the vehicle height at the rear wheel. The detection signals of the vehicle height sensors are entered into an ECU 300 as well as those of the vehicle height sensors M13 for the front wheels M11. In the ECU 300, processing steps shown in FIGS. 11(A) and 11(B) are performed instead of those shown in FIGS. 7 and 8. The second embodiment is characterized by the processing steps shown in FIGS. 11(A) and 11(B).

The processing steps shown in FIGS. 11(A) and 11(B) are hereinafter described in detail. The processing steps shown in FIG. 11(A) are performed so that when a protrusion or sinking of a road surface is detected at the front wheel, the characteristic of the rear wheel suspension is altered, and after a predetermined time interval, the altered characteristic is returned to the original state, just as the processing steps shown in FIG. 6. However, beyond that, the processing steps shown in FIG. 11(A) function so that the passing of the rear wheels over the protrusion or sinking is actually detected to return the characteristic of the rear wheel suspension to the original state as quickly as possible, thus enabling more exact control. The processing steps in early Steps, 901, 902, 903, 906 and 907 shown in FIG. 11(A) are the same as those in Steps 510, 530, 560 and 570 of the first embodiment. The current vehicle height VHF(S) and the average vehicle height VHF(CR) at the front wheel are detected (Step 904). The current vehicle height VHR(S) and the average vehicle height VHR(CR) at the rear wheel are detected (Step 905). The current vehicle heights VHF(S) and VHR(S) and the average vehicle heights VHF(CR) and VHR(CR) are determined in the same manner as the processing steps in Steps 540 and 550 of the first embodiment.

After it is judged that a rear wheel suspension controller which is the second embodiment of the present invention is in an automatic mode (Step 906) and the vehicle is moving (Step 907), it is judged whether or not a flag Fr is set (Step 908). The flag Fr indicates that the processing steps for altering the characteristics of the rear wheel suspensions against the protrusion or sinking of the road surface for the vehicle are being performed. In initial setting, the flag Fr is reset, i.e., Fr=0. When Fr=0, it is judged whether or not the displacement |VHF(S)−VHF(CR)| of the current vehicle height VHF(S) from the average vehicle height VHF(CR) has exceeded a predetermined reference value h0 (Step 909). If the displacement is judged to be not larger than the value h0, the processing steps in the current routine are terminated. If the displacement is judged to have exceeded the value h0, a timer T1 is started and the flag Fr is set, i.e., Fr=1. The timer T1 is for counting up the time for which the rear wheel suspension chracteristic is kept altered. The flag Fr is for judging whether or not the timer T1 should be counting, as shown in FIG. 11(B) which shows a flow chart indicating a routine which is repeatedly executed in every predetermined time interval. If the flag Fr is already set (Step 951), the timer T1 is caused to perform incremental counting (Step 952). If a flag Rr2 mentioned below is already set (Step 953), a timer T2 is caused to perform incremental counting (Step 954).

FIG. 11(A) shows that the minimum time interval (actuator minimum drive set time interval) Tv1, for which the actuator for altering the rear wheel suspension characteristic is kept driven from the time point of the detection of the protrusion or sinking at the front wheel to that of the passing over the rear wheel over the protrusion or sinking, is calculated (Step 911) on the basis of the vehicle speed V after Step 910 as follows:

$$Tv1 = (A1/V) + A2$$

A1: Wheelbase
A2: Compensatory term (constant)

The compensatory term A2 is determined in consideration of the detection lags of the vehicle height sensors 1 and 2, the time taken for the rear wheel to pass over the protrusion or sinking, etc. If a time long enough for the wheelbase to pass the protrusion or sinking at a normal running speed of the vehicle is set as the minimum time interval Tv1, the time interval Tv1 can be a constant one.

The maximum time interval (actuator maximum drive set time interval) Tv2, for which the actuator is kept driven and after which the rear wheel completely passes over the protrusion or sinking and the characteristic of the rear wheel suspension does not need to be kept altered, is calculated on the basis of the actuator minimum drive set time interval Tv1 (Step 912) as follows:

$$Tv2 = Tv1 + A3$$

A3: Compensatory term (constant)

The compensatory term A3 is determined in consideration of the time of the passing of the rear wheel completely over the protrusion or sinking and the responding time of the actuator for returning the suspension characteristic to the original state, The characteristic of the rear wheel suspension is altered (Step 913) in the same manner as Step 620 of the first embodiment. As a result, the processing steps in the current routine are terminated. After that, the processing steps in the routine are started again.

If 'YES' is taken in Step 909 last time, the flat Fr is set (Step 910). For that reason, 'YES' is taken in Step 908 this time. After that, it is judged whether or not the flag Rr1 is already set (Step 914). The flag Rr1 is for indicating that the vehicle height sensor for the rear wheel has detected the protrusion or sinking of the road surface, 'NO' is taken in Step 914 because the rear wheel has not come to the protrusion or sinking yet and the flag Rr1 is in an initially reset. It is then judged whether or not the displacement |VHR(S)−VHR(CR)| of the current vehicle height VHR(S) at the rear wheel from the average vehicle height VHR(CR) has exceeded a predetermined reference value h1 (Step 915). If the displacement is judged to be not larger than the value h1 because the rear wheel has not come to the protrusion or sinking yet, it is then judged whether or not the count of the timer T1 already started by the processing step in Step 910 has exceeded the actuator maximum drive set time interval Tv2 (Step 917). If the count is judged not to have exceeded the time interval Tv2, the processing steps in the routine are terminated. This condition means that the front wheel has passed over the protrusion or sinking but the rear wheel has not yet. When the count of the timer T1 is thereafter judged to have exceeded the time interval Tv2, 'YES' is taken in Step 717, and the flags Fr, Rr1 and Rr2 are reset and the timers T1 and T2 are cleared (Step 918). The characteristics of the rear wheel suspension is then returned to the original state (Step 919).

Thus, the characteristic of the rear wheel suspension is not left altered but is returned to the original state (Step 919), after the time interval Tv2, even if the protrusion or sinking is not detected by the vehicle height sensor for the rear wheel (Step 915). As a result, the controllability and stability of the vehicle and the feeling of ride thereof are prevented from being deteriorated because of a possible fact that the rear wheel vehicle height sensor fails to detect the protrusion or sinking or the protrusion or sinking moves not to be detected after the passing of the front wheel over it, which would result in keeping the suspension characteristics altered over a necessary time.

When the protrusion or sinking is detected by the rear wheel vehicle height sensor before a relation T1>T2 arises in Step 917, the current rear wheel vehicle height VHR(S) and the average rear wheel vehicle height VHR(CR) have a relationship |VHR(S)−VHR(CR)>h1. The value h1 is set to detect that the rear wheel passes over the protrusion or sinking. Under the relationship, 'YES' is taken in Step 915, and the flag Rr1 is set (Step 916). If the relation T1>T2 still exists (Step 917), the processing steps are terminated.

When the processing steps are started next time, 'YES' is taken in Step 914 because of Rr1=1, and it is judged whether or not the flag Rr2 is already set (Step 920). The flag Rr2 is for indicating that the rear wheel vehicle height has a relationship |VHR(S)−VHR(CR)|<Δh where Δh is smaller than h1 and serves as a reference for finding out the situation that the characteristics of the rear wheel suspension should be returned to the original state if |VHR(S)−VHR(CR)| becomes smaller than Δh. If the relationship |VHR(S)−VHR(CR)|<Δh does not exist, 'NO' is taken in Step 920, and 'NO' is also taken in Step 921 because it is judged whether or not the relationship exists in Step 921. If it is not judged in Step 917 that the relation T1>T2 does not exist, the processing steps are terminated. After that, until the displacement |VHR(S)−VHR(CR)| of the rear wheel vehicle height having increased beyond h1 bcomes smaller than h, the spell of Steps 901, 908, 914, 920 and 917 is repeated as long as a relation T1=<Tv2 exists. If another relation T1>T2 exists, 'YES' is immediately taken in Step 917 so that the characteristic of the rear wheel suspension is returned to the original state (Step 919).

When |VHR(S)−VHR(CR)| has decreased to below Δh, 'YES' is taken in Step 921, the timer T2 is provided to return the characteristic of the rear wheel suspension to the original state a time interval T after the rear wheel has passed over the protrusion or sinking. Backing 920 'YES' is taken because of Rr2=1, and it is judged whether or not the timer T2 has exceeded ΔT (Step 923), if it is judged whether or not the timer T2 has exceeded ΔT, Step 917 is taken, so that the characteristic of the rear wheel suspension is not returned to the original state as long as the relation T1=<Tv2 still exists, after that, if a relation has come into existence, 'YES' is taken in Step 923. It is confirmed in Step 924 whether or not the relation T1>Tv1 exists, in order that the control might not be made inappropriate due to a wrong detection or a confusion with the detection of other continuous protrusions or sinkings. If 'YES' is take in Step 924, the processing steps in Steps 918 and 919 are performed, so that the characteristic of the rear wheel suspension is returned to the original state. If it is judged in Step 924 that the relation T1=<Tv1 exists, 'NO' is taken in step 924 to terminate the processing steps without returning the characteristic of the rear wheel suspension to the original because the rear wheel is likely to pass over the protrusion or sinking immediately after the characteristic is returned so.

Figure 12:
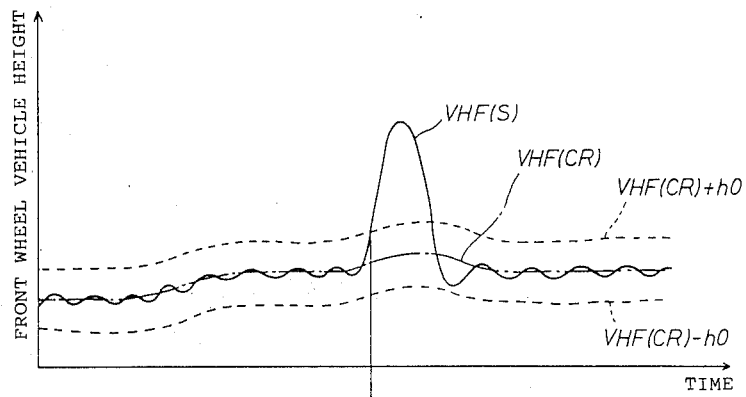
FIGS. 12(A), 12(B) and 12(C) show time charts in relation to the processing steps shown in FIGS. 11(A) and 11(B).
Figure 12:
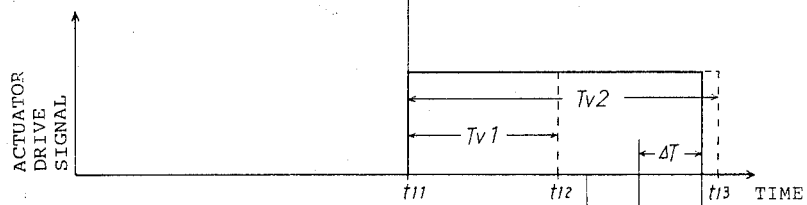
Figure 12:
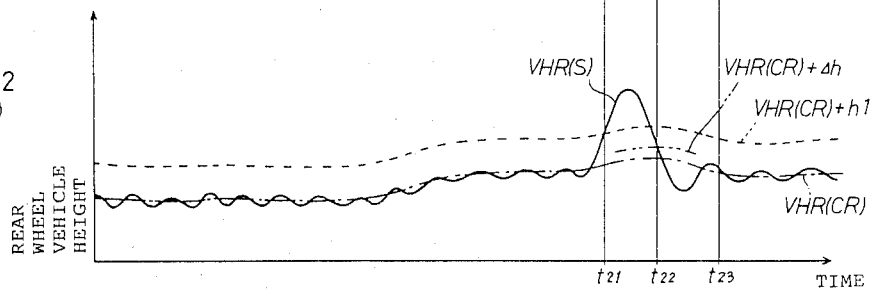

The above-mentioned processing steps are shown by time charts in FIG. 12(A)–(C). FIG. 12(A) shows the time chart of the front wheel vehicle height. FIG. 12(B) shows the time chart of the actuator drive signal. FIG. 12(C) shows the time chart of the rear wheel vehicle height. FIGS. 12(A)–(C) indicate that the front wheel is moving down into the sinking of the road surface. When the front wheel vehicle height VHF(S) has exceeded a value VHF(CR)+h0 at a time point t11, the actuator drive signal is sent out to alter the characteristic of the suspension to 'hard' to maintain the controllability and stability of the vehicle, for example. At the time point, the time intervals Tv1 and Tv2 are set in consideration of the vehicle speed, the wheelbase, the response time of the actuator, etc. The time interval Tv1 is the actuator minimum drive set time, which is the minimum of the duration of the sending-out of the actuator drive signal and indicates that the sending-out of the actuator drive signal must be surely continued for the time interval Tv1 from the time point t11. This is because it is thought on the basis of the running condition of the vehicle that the rear wheel does reach the sinking of the road surface until a time point t12 which is by the time interval Tv1 later than the time point t11. The time interval Tv2 is the actuator of the sending-out of the actuator drive signal and means that the rear wheel surely passed over the sinking detected at the front wheel at the time point t11 before a time point t13 which is by the time interval Tv2 later than the time point t11. The time charts in FIG. 12 show that the rear wheel vehicle height VHR(S) exceeds VHR(CR)+h1 at a time point t21 after the time point t12. For that reason, the sending-out of the actuator drive signal is terminated at a time point t23 which is by the time Δt later than the time point t22, in consideration of a time which it take the vibration of the rear wheel to disappear. If the sinking is not detected at the rear wheel for some reason such as a detection failure until the time point t13, the sending-out of the actuator drive signal is terminated at the time point 13 because the maximum duration of the sending-out ends at the time point t13. Even if the sinking is detected at the rear wheel between the time points t11 and t13, the sending-out of the actuator drive signal is terminated at the time point t13 as far as the time point t22 or t23 is later than the time point t13. If the time points t21-t23 are within the period from t11 to t12, a detection failure or the like is taken into consideration so that the actuator drive signal is continued at least until the time point t12, and the sending-out of the signal is terminated at the time point t12.

In the second embodiment, two kinds of predetermined time intervals, which are the actuator minimum drive set time interval Tv1 and the actuator maximum drive set time interval Tv2, are used so that the characteristic of each rear wheel suspension is returned to the original state at the end of each of the predetermined time intervals. One of the time intervals Tv1 and Tv2 is occasionally used depending on the time point of the detection of the protrusion or sinking at the rear wheel so that the characteristic of the rear wheel suspension is returned to the original state depending on the time point of the detection of the protrusion or sinking of the road surface at the rear wheel as occasion demands. For that reason, the characteristic of the rear wheel suspension can be controlled more adequately and accurately even in the cases that the vehicle continuously passes over different protrusions or sinkings and that a detection failure occurs.

In the first and the second embodiments, the vehicle height sensors 1 and 2 correspond to the front wheel vehicle height detection means M3 and M13, the processing steps performed in the ECU 300 correspond to those performed by the judgement means M4 and M14, the rear wheel suspension characteristic alteration means M6 and M16 and the return respond to the suspension characteristic operating portions of the rear wheel suspension characteristic alteration means M6 and M16 and the return means M17.

Figure 13:
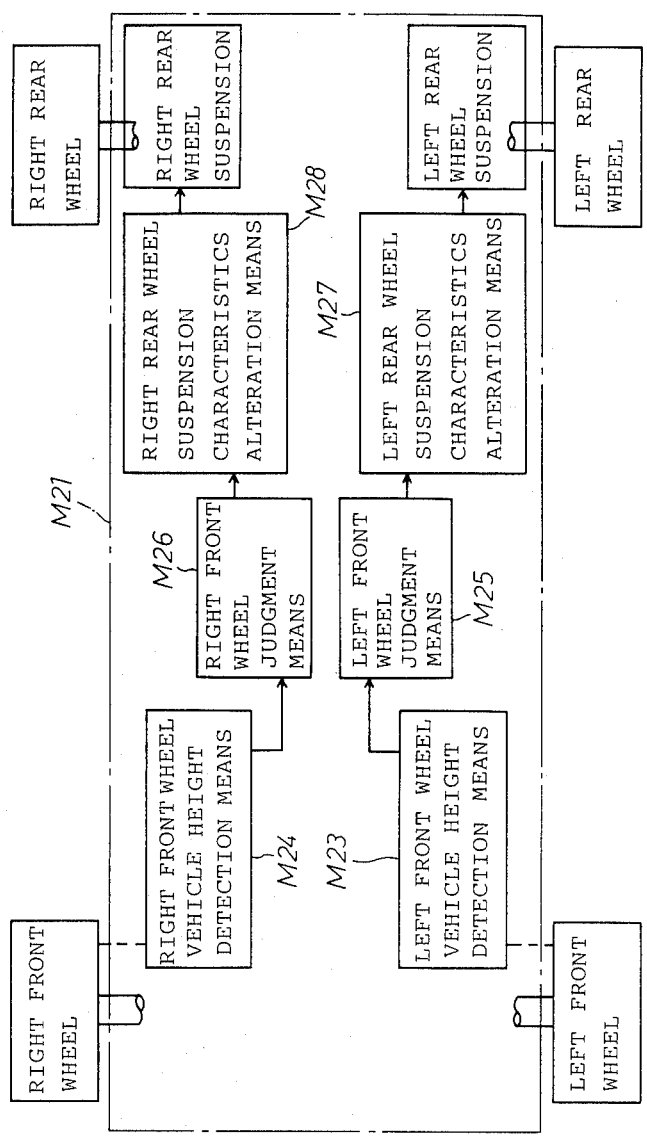
FIG. 13 shows an outline of a constitution of the third embodiment of present invention.
Figure 14:
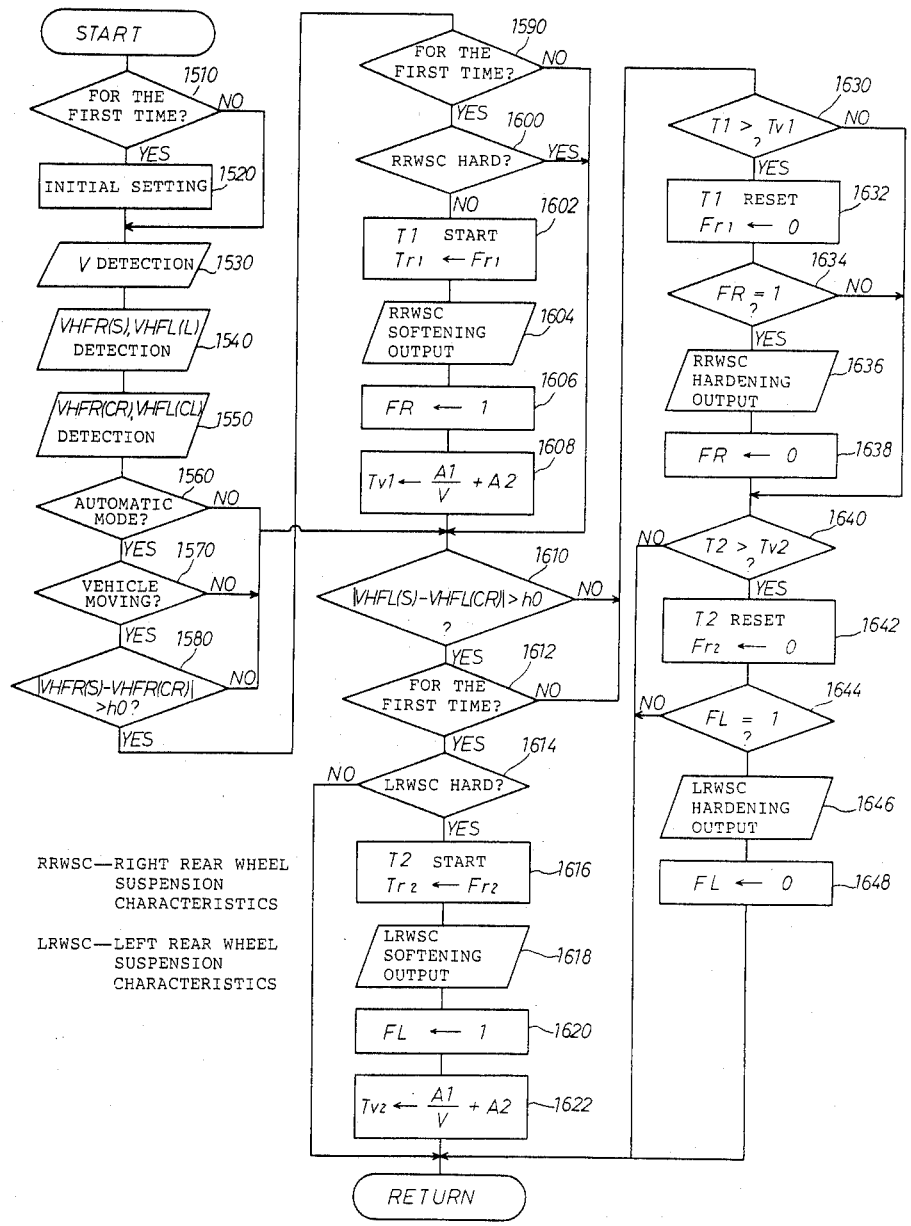
FIG. 14 shows a flow chart of processing steps which are performed in the ECU of the third embodiment.

The third embodiment of the present invention is hereinafter described. FIG. 13 shows the outline of the constitution of this embodiment. Unlike the first embodiment shown in FIG. 1, the third embodiment has a feature that front wheel vehicle height detection means M23 and M24, judgement means M25 and M26 and rear wheel suspension characteristic alteration means M27 and M28 are separately provided for the right and left portions of the body M21 of the vehicle. The third embodiment is hereinafter described in detail. The constitution of the units of the third embodiment is the same as that of the first embodiment, as shown in FIG. 2. The third embodiment is different from the first embodiment in the sequence of the processing steps which are performed by the ECU 300. The processing steps are described below referring to a flow chart shown in FIG. 14. The processing steps of this embodiment shown in the flow chart are performed by the ECU 300 in response to vehicle height sensors of the linear type, which send out analog signals and each of which is shown in FIG. 5(B). The processing steps are repeatedly performed in every predetermined time interval such as 5 msec. An outline of the processing steps shown in the flow chart is as follows:

(1) A current vehicle heights VHFR(S) are VHFL(S) and an average vehicle heights VHFR(CR) and VHFR(CR) at the right and left front wheels of the vehicle are determined first (Steps 1540 and 1550).

(2) It is judged whether or not the displacement of the current right front wheel vehicle height from the average vehicle height has exceeded a predetermined value h0 (Step 1580).

(3) If the displacement is judged to have exceeded the predetermined value h0, the characteristic of the suspension for the right rear wheel is altered to 'soft' to deal with passing over the protrusion or sinking of the road surface for the vehicle (Step 1604). At that time, an actuator 3d is driven to connect a main air chamber 3b to each other to decrease the spring constant of an air spring, reduce the damping force of a shock absorber 3a or perform a similar operation, to prevent the right rear portion of the vehicle from being shocked.

(4) It is judged whether or not the displacement of the current left front wheel vehicle height VHFL(S) from the average vehicle height VHFL(CR) has exceeded the predetermined value h0 (Step 1610).

(5) If the displacement is judged to have exceeded the predetermined value h0, the characteristic of the left rear wheel suspension is made 'soft' to deal with passing over the protrusion or sinking of the road surface (Step 1618). At that time, an actuator 4d is driven to connect the main air chamber 4b and auxiliary air chamber 4c of the air suspension 4 to each other to decrease the air spring constant or reduce the damping force of the shock absober 4a.

The above-mentioned items (1)–(5) are the main processing steps for producing the effect of the present invention through the third embodiment. In addition, other processing steps are performed in this embodiment as follows: (6) Subsequently to the item (5), the characteristic of each of the right and left rear wheel suspensions is returned to the original state after the rear wheels pass over the protrusion or sinking (Steps 1636 and 1646).

Figure 15:
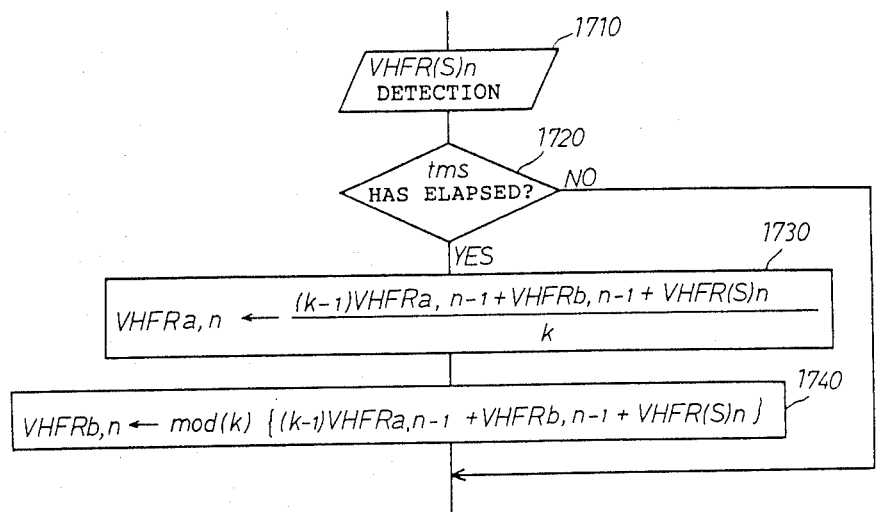
FIG. 15 shows a flow chart of some of the processing steps, which are for calculating an average value of the vehicle height signal in the third embodiment.

The processing steps in the third embodiment are hereinafter described in detail. The processing steps are repeatedly performed in every 5 msec. It is judged whether or not the processing steps are being performed for the first time since the activation of the ECU 300 (Step 1510). If the processing steps are judged to being performed for the first time since the activation of the ECU 300, initial setting is performed (Step 1520), all variables are cleared and all flags are reset. After the initial setting is performed (Step 1520) or if the processing steps in the routine are judged to be being performed for the second time or later since the activation of the ECU 300, the vehicle speed V is detected (Step 1530) The vehicle speed V is detected in terms of the output signal of a vehicle speed sensor 250. Current right and left front wheel vehicle heights VHFR(S) and VHFL(S) are then detected (Step 1540). The past output values of the vehicle height sensor 1 are averaged to set an average height (Step 1550). In this embodiment, the average vehicle height VHFR(CR) is directly determined from the output signal of the vehicle height sensor 1 through a CR filter circuit 350a which is a low-pass filter and shown in FIG. 5(B). If the vehicle height sensor 1 sends out a digital signal, the average may be determined from past vehicle heights VHFR(S) measured in the ECU 300. For example, the latter determination is effected through processing steps shown in FIG. 15, instead of those in STeps 1540 and 1550 shown in FIG. 14. In the processing steps shown in FIG. 15, the current vehicle height VHFR(S)n is detected first (Step 1719), and the average VHFRa,n is then calculated (Steps 1730 and 1740) in every predetermined operation unit time interval tms (Step 1720). In step 1730, the following calculation is carried out:

$$VHFRa,n = \{(k-n)VHFRa,n-1 + VHFRb,n-1 + VHFR(S)n\}/k$$

k: Number of measured values to be averaged
VHFRa,n: Average to be calculated currently (n-th time)
VHFRa,n−1: Average calculated previously {(n−1)-th time}
VHFR(S)n: Measured value of current vehicle height
VHFRb,n−1: Value calculated previously for convenience to calculate the average VHFRa,n In step 1740, VHFrb,n is calculated as follows:

$$VHFRb,n = mod(k)\{(k-1)VHFRAa,n-1 + VHFRb,n-1 + VHFR(S)n\}$$

In such calculation, mod(A) {B} means the value of the remainder in the division of B by A. The processing steps in Steps 1730 and 1740 constitute such a simple method of determining an average, that if only VHFRa,n, VHFRa,n−1 and VHFRb,n are stored in a memory beforehand, a value approximate to an average can be calculated and past (k−1) pieces of data do not need to be stored. For that reason, the space of the memory and the time of the calculation can be saved if the simple method is adopted. If the space of the memory and the time of the calculation are enough for use, a required number of measured values may be averaged normally. The average vehicle height VHFL(CR) at the left front wheel can be determined in the same manner as that at the right front wheel.

After the detection of the averages (Step 1550), it is judged whether or not the control of the suspension is in an automatic mode (Step 1560). For example, if the driver of the vehicle has not selected the automatic mode with a manual switch, the processing steps in the routine are terminated. If the driver has selected the automatic mode, it is then judged whether or not the vehicle is moving (Step 1570). If the detected output of the vehicle speed sensor 250 is not lower than a predetermined value, the vehicle is judged to be moving. In that case, it is then judged whether or not the displacement |VHFR(S)−VHFR(CR)| of the right front wheel current vehicle height VHFR(S) from the average vehicle height VHFR(CR) has exceeded a predetermined reference value h0 (Step 1580). If the displacement is judged to be not larger than the value h0, it is then judged whether or not the processing steps are being performed for the first time since the displacement exceeded the value h0. If the processing steps are judged to be being performed for the first time since the displacement exceeded the value h0, it is then judged whether or not the characteristic of the right wheel suspension is already made 'hard' (Step 1600). After Step 1600, a time T1 is started and a flag Fr1 is set (Step 1602). The timer T1 is for counting up the time for which the characteristic of the rear wheel suspension is kept altered. The flag Fr1 is for finding out whether the timer T1 should be caused to perform incremental counting, as shown FIG. 16 which shows a flow chart indicating a routine which repeatedly executed in every predetermined time interval. If the flag Fr1 is already set (Step 1810), the timer T1 is caused to perform incremental counting (Step 1820).

After Step 1602, the characteristic of the right rear suspension is altered to 'soft', and a flag Fr indicating the 'soft' state of the characteristic is set (Steps 1604 and 1606). At that time, a signal is sent out from a CPU 301 to an actuator 3d to rotate a valve 44b to connect a main air chamber 3b and an auxiliary air chamber 3c of the air suspension 3 to each other to alter the characteristic to 'soft' (small spring constant), thus absorbing the shock at the rear wheel.

After the alteration of the characteristic of the right rear wheel suspension (1604), the time interval Tv1 from the time point of the detection of the protrusion or sinking of the road surface at the front wheel to that of the rear wheel's passing over the protrusion or sinking is calculated (Step 1608) on the basis of the vehicle speed V as follows:

$$Tv1 = (A1/V) + A2$$

A1: Wheelbase
A2: Compensatory term (constant)
The conpensatory term A2 is determined in consideration of the detection lag of the vehicle height sensor 1, the time taken for the rear wheel to pass over the protrusion or sinking, etc. Judgement as to the right front wheel is thus completed. The processing steps for the left front wheel are then performed in the same manner as the right front wheel. In steps 1610 1622, judging as to the relationship between the displacement in the current left front wheel vehicle height VHFL(S) from the average vehicle height VHFL(CR) and a value h0, judging whether or not the processing steps are being performed for the first time, judging whether or not the characteristic of the left rear wheel suspension is 'hard', stating a timer T2, setting a flag Fr2 indicating the counting of the timer T2, outputting for making the characteristic of the left rear wheel suspension 'soft', and calculating a time interval Tv2 taken for the left rear wheel to pass over the protrusion or sinking are performed in the same manner as Steps 1580-1608.

Figure 16:
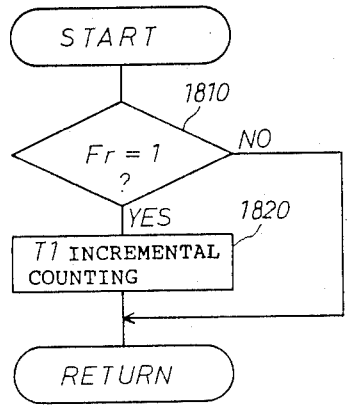
FIG. 16 shows a flow chart of some of the processing steps, which correspond to an incremental counting of a timer of the third embodiment.

When the characteristic of the right rear wheel suspensions is to be returned to the original state after the characteristic is altered to 'soft', it is judged (Step 1630) through comparison with the count of the timer T1 whether or not the time interval Tv1 determined in Step 1608 has elapsed. If the count of the timer T1 is judged to be not larger than the time interval Tv1, the processing steps in the routine are terminated. If the count of the timer T1 is judged to have exceeded the time Tv1, in other words, if the time interval Tv1 has elapsed since the characteristic of the right rear wheel suspension was altered to 'soft' the timer T1 is reset, and the flag Fr1 is reset (Step 1632). For that reason, 'No' is taken in Step 1810 for a processing step for causing the time T1 to perform incremental counting, as shown in FIG. 16, while the flag Fr1 is set, so that the incremental counting of the timer T1 is stopped.

It is judged as to the flag FR whether or not the characteristic of the right rear wheel suspension is 'soft' (Step 1634). If the characteristic of the suspension is judged to be 'soft', the characteristic is returned to the original state (Step 1636). At that time, if the main air chamber 3b and auxiliary air chamber 3c of the right rear wheel air suspension 3 have been connected to each other, the valve 44b is rotated to close the air passage between both the air chambers; or if the air passage between both the air chambers has been closed to attach more importance to the controllability and the stability of the vehicle, the valve 44b is rotated to connect the air chambers to each other, so that the characteristic is returned to the original state. After that, the flag Fr indicating that the characteristic is returned to the original is reset (Step 1638).

To return the characteristic of the left rear wheel suspension to the original state, the same processing steps as Steps 1630 1638 are performed in Steps 1640-1648. At that time, judging whether or not the time interval Tv2 determined in Step 1622 has elapsed, resetting the timer T2 and the timer flag Fr2, judging as to a flag FL whether or not the characteristic of the left rear wheel suspension is 'soft', and resetting the flag FL indicating the alteration to 'hard' are performed.

Thus, the characteristic of the right rear wheel suspension is altered to 'soft' when the protrusion or sinking of the road surface is detected at the right front wheel; and the characteristic of the left rear wheel suspension is altered 'soft' when the protrusion or sinking is detected at the left front wheel. In other words, the characteristics of the rear wheel suspensions on the same sides of the vehicle as the front wheels are altered independently of each other as to the right and left sides of the vehicle, because the right and left wheels do not always receive a shock at the same time. For that reason, if the front wheel on one side has received the shock, the characteristic of the suspension for the rear wheel on the same side is made 'soft' to absorb the shock on the rear wheel, and that of the suspension for the rear wheel on the other side is kept normal or 'hard' to keep the posture of the vehicle body unchanged, so that the controllability and the the stability of the vehicle are kept good. If the characteristic of the rear wheel suspension, which is not mode 'soft' in the above-mentioned case, is altered from 'soft' or 'normal' to 'hard', the controllability and the stability of the vehicle are made better.

Figure 17A:
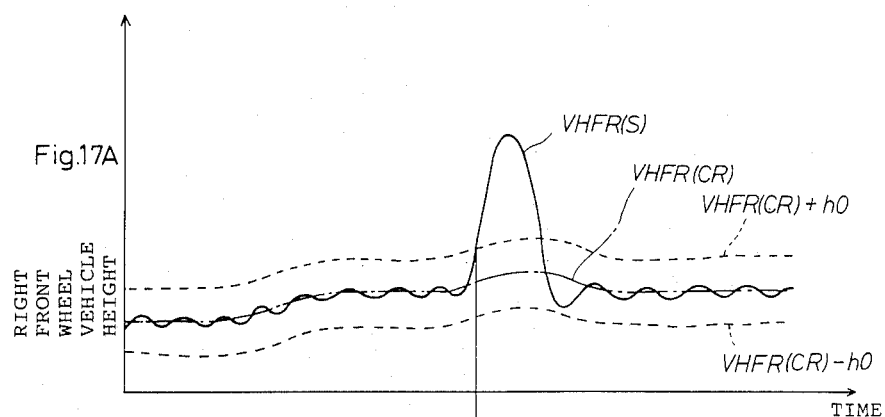
FIG. 17(A)–(C) hows time charts of some of the processing steps shown in FIG. 14.
Figure 17B:
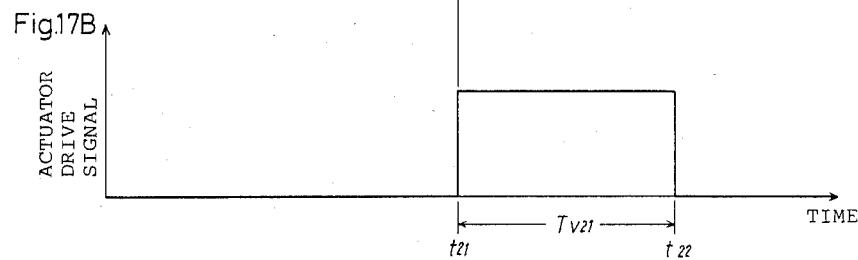
Figure 17C:
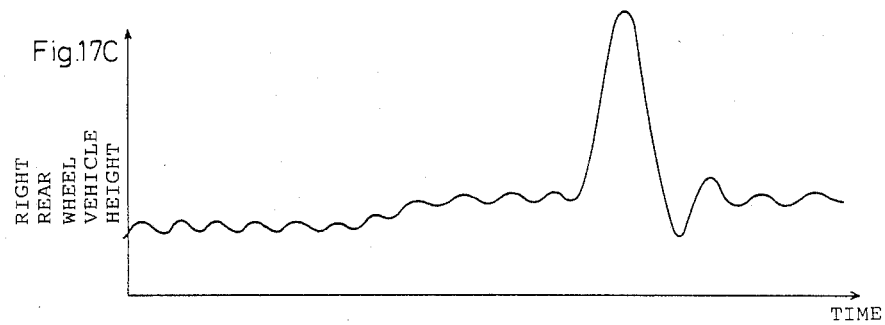

Some of the above-mentioned processing steps are shown by time charts in FIG. 17. Before a time point t21, FIG. 17 shows that the automobile is moving on a flat road surface. The processing steps shown by the time charts are hereinafter described as to the right front and rear wheels of the vehicle. The vehicle height VHFR(S) obtained from the vehicle height sensor 1 draws waves of small amplitude. The average vehicle height VHFR(CR) obtained from the CR filter circuit 305a draws a smoothed form of the waves. When the right front wheel has begun to move down into the sinking of the road surface, the vehicle height VHFR(S) sharply increases. At the time point t21, the vehicle height VHFR(S) exceeds VHFR(CR)+h0, and it is judged in Step 1580 in the flow chart shown in FIG. 14, that a relationship |FHFR(S)−VHFR(CR)| >h0 has come into existence. At the time point t21, the ECU 300 starts sending out a drive signal to the actuator 3d to drive the valve 44b in the air passage of the air suspension 3. While the drive signal is being sent out, the air passage is opened so that the main air chamber 3b and auxiliary air chamber 3c of the air suspension 3 are connected to each other. At a time point t22 which is by a time interval Tv21 later than the time point 21, the drive signal is not sent out, so that the air passage is closed by the valve 44b. Between the time points t21 and t22, the right rear wheel moves down into the sinking detected at the right front wheel. If different drive signals for opening and closing the valves 44b are used, the opening drive signal is sent out at the time point t21 and the closing drive signal is sent out at the time point t22.

If the wheel moves up on the protrusion of the road surface, the vehicle height draws the deepest through, and the actuator 3d is driven when the current vehicle height VHFR(S) has become lower than VHFR(CR)-h0.

When the protrusion or sinking is detected at the left front wheel, the same processing steps as those for the right front wheel are performed.

In the example shown in FIG. 17, when the wheel is moving down into the sinking of the road surface, the main air chamber 3b and the auxiliary air chamber 3c are connected to each other to prevent the vehicle from being shocked. For that reason, a vehicle height amplitude at the right rear wheel is larger than that of the normal running state. However, when the controllability and the stability of the vehicle are aimed to keep good, the vehicle height at the right rear wheel is smaller than normal because the chambers 3b and 3c are disconnected from each other.

Since the characteristics of the suspensions are altered independently of each other as to the right and left sides of the vehicle in this embodiment, as described above, the controllability and the stability of the vehicle can be kept good or the rear portion of the vehicle is prevented from being shocked, as to the protrusion or sinking over which one front wheel has passed. Since the possible shocking of the rear wheel would impart an unpleasant vibration to not only the rear seat of the vehicle but its front seat, the absorption of the possible shock of the rear wheel is effective enough to prevent the possible shock of the whole vehicle to improve the feeling of ride thereof. Since the characteristic of each rear wheel suspension is not unclearly altered but is set for a distinct difference between the case of passing over a protrusion or sinking and that of running on a flat part of a road surface, the controllability and the stability of the vehicle and the feeling of ride thereof in moving on the flat part of the road surface are simultaneously kept good. In addition, the degree of freedom of design of the characteristic of the suspension is increased.

Though the main air chambers 3b and 4b and the auxiliary air chambers 3c and 4c are completely connected to or disconnected from each other in the above-mentioned descripions of the first, the second and the third embodiments, the characteristic of each suspension can be controlled to an intermediate state depending on the displacement of the vehicle height if the air passages 70 and 74 of the valve 44b are selectively used. The control rods 20 for the shock absorbers 3a and 4a provided in the air suspensions 3 and 4 may be operated by the actuators 3d and 4d separately from the valves 44b, instead of the operation of the air spring units 14, to change the damping forces of the shock absorbers. Both the damping force of each shock absorber and the spring constant of each air sping unit may be changed. For example, in order to prevent the rear portion of the vehicle from being shocked by a protrusion or sinking of a road surface, the damping forces of the shock absorbers 3a and 4a may be reduced by the actuators 3d and 4d.

Though it is judged whether or not the characteristic of the suspension should be altered, depending on whether or not the difference between the current vehicle height VHFR(S) and the average vehicle height VHFR(CR) to VHFL(CR) has gone out of the range of $\pm h0$, in the first, the second and the third embodiments, it may be judged whether or not the characteristic of the suspension should be altered, depending on the speed, acceleration or amplitude of the displacement of the current vehicle height VHFR(S) or VHFL(S). Since the initial condition of the movement of the front wheel over the protrusion or sinking of the road surface is clarified in the judgement on the basis of the speed or acceleration of the displacement of the vehicle, the movement over the protrusion or sinking can be quickly dealt with. The judgement on the basis of the amplitude of the displacement of the vehicle height produces a good effect particularly when importance is attached to the controllability and the stability of the vehicles.

Figure 18:
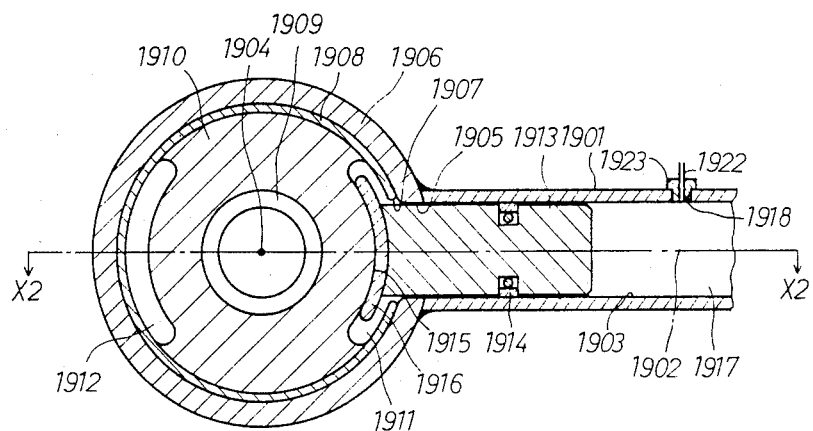
FIGS. 18(A) and 18(B) show sectional views of a variable-stiffness bush used in a suspension characteristic alteration means.
Figure 18:
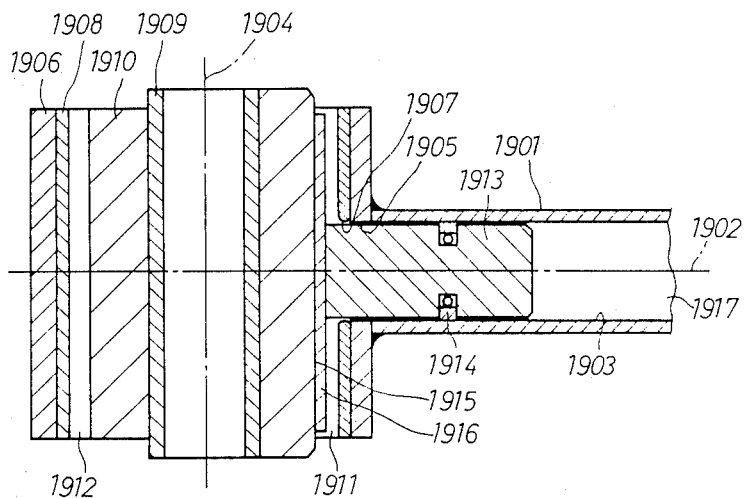

Examples of other suspension characteristic alteration means not for any air suspension are described below. The first example is bush for a joint of a suspension bar such as the upper and lower control arms of a suspension, as shown in FIGS. 18(A) and 18(B). The bush is provided with a mechanism for changing the stiffness of the bush to alter the characteristic of a suspension. The changing of the stiffness means that of the spring constant or damping force of the bush. FIG. 18(A) shows a longitudinal sectional view of the joint of the suspension bar. FIG. 18(B) shows a sectional view along a line X2—X2 shown in FIG. 18(A). A control arm 1901 extends along an axis 1904 perpendicular to the axis 1902. A sleeve 906 which has ahole 905 is welded around the hole 1905 at one end of the control arm 1901. An outer cylinder 1908 having a hole 1907 is press-fitted in the sleeve 1906. An inner cylinder 1909 is provided in the outer cylinder 1908 concentrically thereto. The bush 1910 made of vibration-proof rubber is interposed between the outer cylinder 1908 and the inner cylinder 1909. The bush 1910 and the outer cylinder 1908 define openings 1911 and 1912 which are located in the face of each other along the axis 1902 and extend as arcs around the axis 1904, so that the stiffness in the direction of the axis 1902 is set at a relatively low value. The hole 1903 of the control arm 1901 constitutes a cylinder which supports a piston 1913 movably back and forth along the axis 1902. A sealing member 1914 is tightly packed in between the piston 1913 and the inside surface of the hole 1903. A contact plate 1916 is secured at one end of the piston 1913. The contact plate 1916 curves about the axis 1904 and extends along the axis so that the plate is brought into tight contact with the inside surface 1915 of the opening 1911. The same construction as shown in FIGS. 18(A) and 18(B) is provided at the other end of the control arm 1901. A cylinder chamber 1917 is defined between the piston 1913 and another piston not shown in the drawings fitted with the other end of the control arm 1901. The cylinder chamber 1917 communicates with the exterior through a tapped hole 1918 provided in the control arm 1901. A nipple 1923 secured on one end 1922 of a conduit connected to an oil pressure source not shown in the drawings is secured in the tapped hole 1918 to apply oil pressure to the cylinder chamber 1917. When the oil pressure in the cylinder chamber 1917 is relatively low, the force pushing the piston 1913 leftward as to the drawings is so weak that the piston is held in such a position shown in the drawings that the contact plate 1916 is brought into light contact with the inner surface 1915 of the bush 1910. As a result, the stiffness of the bush 1910 in the direction of the axis 1902 is made relatively low. When the oil pressure in the cylinder chamber 1917 is relatively height, the piston 1913 is driven leftward as to the drawings and the contact plate 1916 pushes the inner surface 1915 of the bush 1910 so that the portion of the bush between the contact plate and the inner cylinder 1909 is compressed. As a result, the stiffness of the bush 1910 in the direction of the axis 1902 is heightened.

If the suspension bar is provided between the body and rear wheel of a vehicle, the characteristic of the suspension for the rear wheel can be altered by regulating the oil pressure in the cylinder chamber 1917 through the action of an actuator such as a pressure control valve. When the oil pressure is heightened by an instruction from an ECU 300, the stiffness of the bush 1910 is enhanced to increase the damping force and spring constant of the suspension to improve the controllability and the stability of the vehicle. When the oil pressure is lowered, the shock at the rear portion of the vehicle is reduced.

Figure 19:
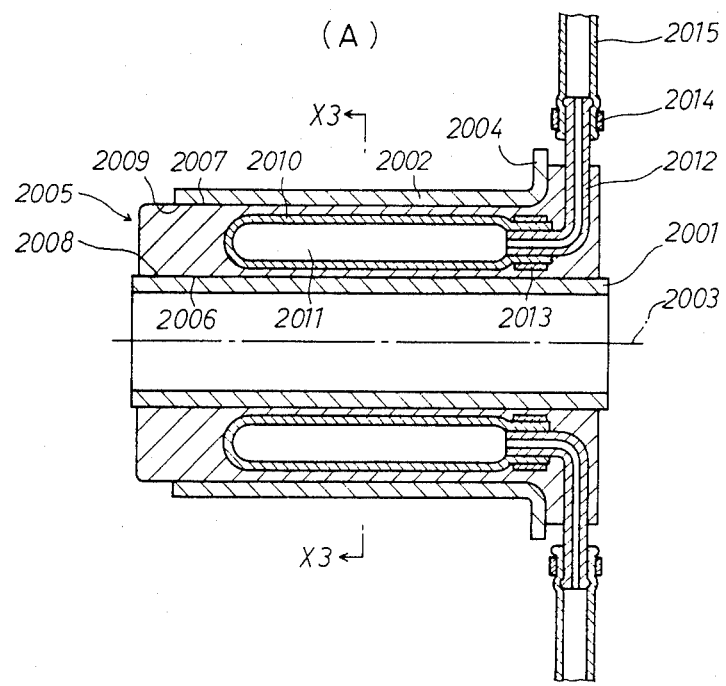
FIGS. 19(A) and 19(B) show sectional views of another variable-stiffness bush.
Figure 19:
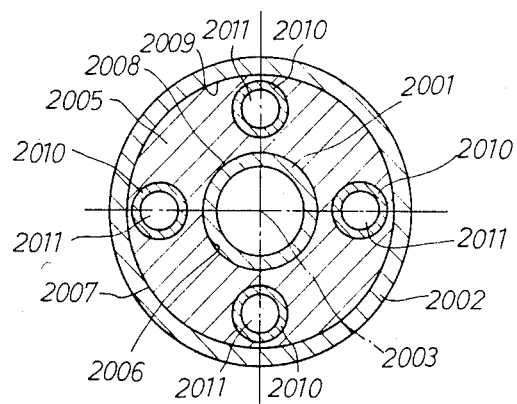

The second example is another bush shown in FIGS. 19(A) and 19(B) and having the same function as the former. FIG. 19(A) shows a longitudinal sectional view of the bush constructed together with an inner and an outer cylinders as a bush assembly. FIG. 19(B) shows a sectional view along a line X3—X3 shown in FIG. 19(A). Four expansible and compressible hollow bags 2010, which extend along an axis 2003 and are separately located in equiangular positions around the axis, are embedded in the bush 2005, and define four chambers 2011 extending along the axis 2003 and separately located in equiangular positions around the axis. Each hollow bag 2010 is secured at one end of a coupler 2012 embedded in the bush 2005, by a clamp 2013, so that the chamber 2011 communicates with the exterior of the bush through the coupler 2012. One end of a hose 2015 is fixedly connected to the other end of the coupler 2012 by clamp 2014, and the other end of the hose 2015 is connected to a compressed air source through an actuator such as a pressure control valve not shown in the drawings, so that controlled air pressure can be introduced into each chamber 2011. When the actuator is put in operation by an ECU 300, the air pressure in each chamber 2011 can be varied to change the stiffness of the bush in a stepless manner. The stiffness of the bush can thus be appropriately changed to be high (hard) or (soft) after a shock at the front wheel of a vehicle is detected.

Figure 20:
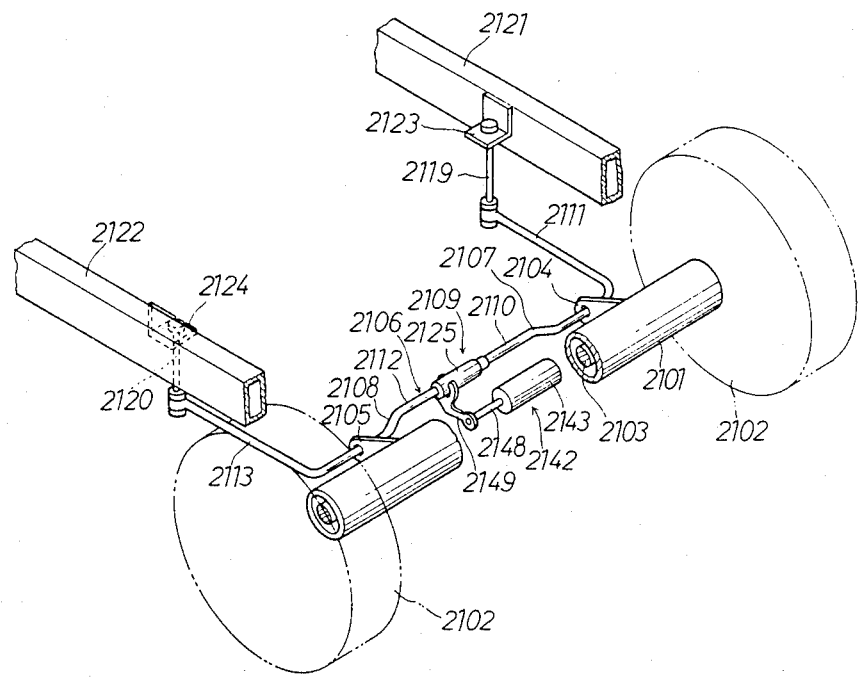
FIGS. 20(A)–20(G) show a construction of a variable-stiffness stabilizer.
Figure 20:
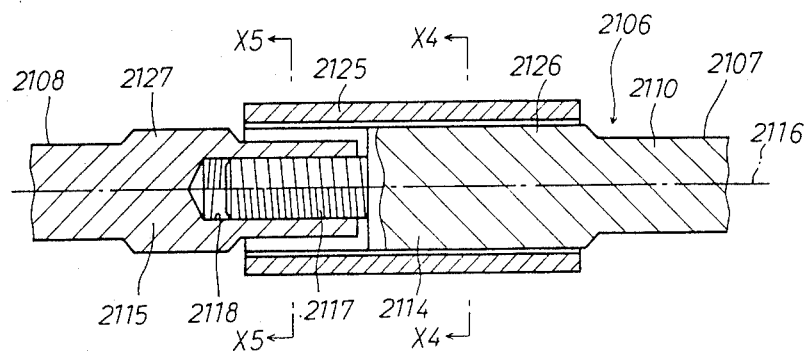
Figure 20:
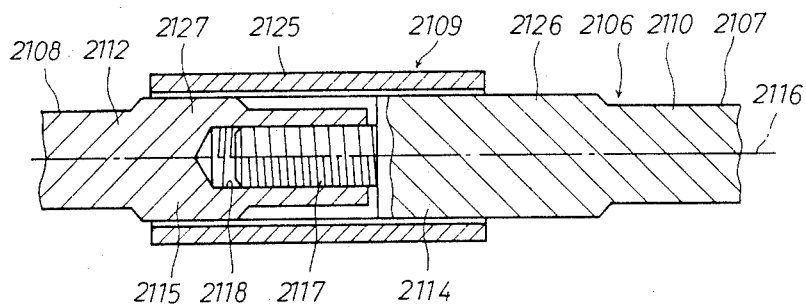
Figure 20:
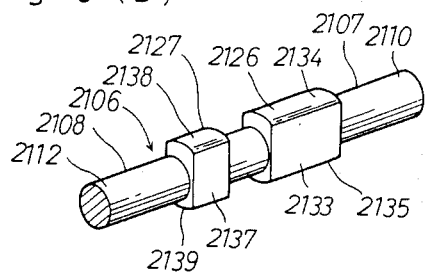
Figure 20:
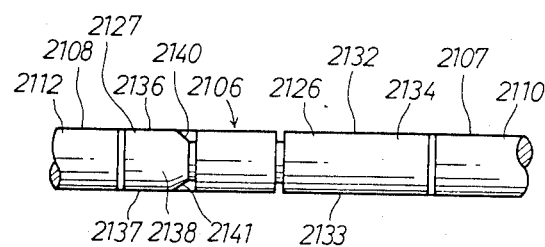
Figure 20:
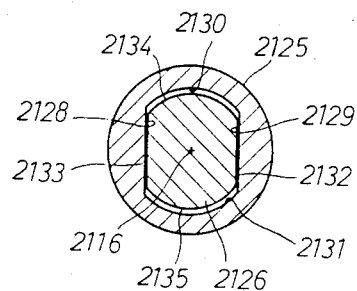
Figure 20:
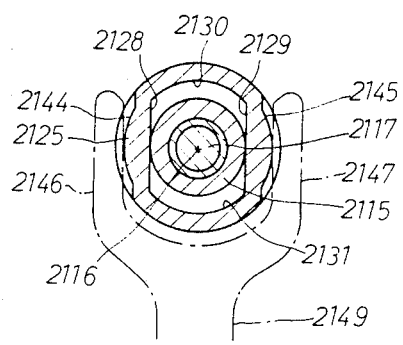

FIGS. 20(A)-20(G) show a construction of a stabilizer as the third example. FIG. 20(A) shows a exploded oblique view of the torsion-bar-type stabilizer build in the axle-type rear suspension of an automobile. FIGS. 20(B) and 20(C) show enlarged partial longitudinal sectional views of the main part of the stabilizer in the coupled and uncoupled states thereof. FIGS. 20(D) shows an oblique view of the main part shown in FIGS. 20(B) and 20(C) and removed of a clutch. FIG. 20(E) shows a plan view of the main part shown in FIG. (D). FIG. 20(F) shows a sectional view along a line X4—X4 shown in FIG. 20(B). FIG. 20(G) shows a sectional view along a line X5—X5 shown in FIG. 20(B). An axle 2103 coupled with wheels 2102 is rotatably supported by an axle housing 2101. A pair of brackets 2104 and 2105 are secured on the axle housing 2101, in positions separated from each other in the direction of the width of the automobile. The torsion-bar-type stabliizer 2106 is coupled to bushes not shown in the drawings. The stabilizer 2106 includes a right portion 2106 and the left portion 2108 can be selectively coupled to each other integrally by a coupling unit 2109. A protrusion 2117 and a hole 2118, which extend along an axis 2116, are formed at the ends 2113 and 2115 of rods 2110 and 2112 opposite arms 2111 and 2113, and are provided with a male screw and a female screw which are engaged with each other to couple the rods 2110 and 2112 rotatably relative to each other around the axis 2116. The tips of the arms 2111 and 2113 are coupled to brackets 2123 and 2124 secured on the side frames 2121 and 2122 of the vehicle, by links 2119 and 2120. The coupling unit 2109 includes the cylindrical clutch 2125, a clutch guide 2126 which is provided at one end 2114 of the rod 2110 and supports the clutch 2125 unrotatably relative to the guide around the axis 2116 but movably back and forth along the axis, and a clutch bearer 2127 which is provided at the end 2115 of the rod 2112 and bears the clutch 2125 unrotably relative to the bearer around the axis 2116. The inside circumferential surface of the clutch 2125 includes planes 2128 and 2129 facing each other across the axis 2116 and extending in parallel with each other along the axis, and partially cylindrical surfaces 2130 and 2131 adjoining the planes in positions opposed to each other across the axis 2116, as shown in FIGS. 20(F) and 20(G). Correspondingly to the inside circumferential surface of the clutch 2125, the peripheral surface of the clutch guide 2126 includes planes 2132 and 2133 facing each other across the axis 2116 and extending in parallel with each other across the axis, and partially cylindrical surfaces 2134 and 2135 adjoining the planes in position opposed to each other across axis 2116. The peripheral surface of the clutch bearer 2127 include planes 2136 and 2137 facing each other across the axis 2116 and extending in parallel with each other along the axis, and partially cylindrical surfaces 2138 and 2139 adjoining the plane in position opposed to each other across the axis 1116. The planes 1132 and 1133 of the clutch 1126 are always engaged with those 2128 and 2129 of the clutch 2125. When the clutch 2125 is in a position shown in FIG. 20(C), the planes 2136 and 2137 of the clutch bearer 2127 are also engaged with those 2129 and 2128 so that the right portion 2107 and left portion 2108 of the atabilizer are integrally coupled to each other unrotatably relative to each other around the axis 2116. The ends of the planaes 2136 and 2137 of the clutch bearer 2127 at the right portion 2107 of the stabilizer are chamfered at 2140 and 2141 so that even if the rods 2110 and 2112 are slightly rotated relative to each other around the axis 2116, the clutch 2125 can be moved from a position shown in FIG. 20(B) to a position shown in FIG. 20(C), to couple the right portion 2107 and left portion 2108 of the stabilizer integrally to each other as the arms 2111 and 2113 of the portions are on the same plane. The clutch 2125 is moved back and forth along the axis 2116 by an actuator 2142 regulated by an ECU 300. The actuator 2142 includes a hydraulic piston-cylinder unit 2143 secured on a differential casing not shown in the drawings, and a shifting fork 2149 which includes arms 2146 and 2147 engaged in the grooves 2144 and 2145 of the peripheral surface of the clutch 2125, as shown in FIG. 20(G), and is coupled to the piston rod 2148 of the piston-cylinder unit 2143. When the clutch 2125 is placed in a position shown in FIG. 20(C), by the actuator 2142 according to an instruction from the ECU 300, the right portion 2107 are left portion 2108 of the stabilizer 2016 are integrally coupled to each other to put the stabilizer in such a state that it can fulfill its function to reduce the rolling of the vehicle to improve its controllability and stability. When the clutch 2125 is placed in a position shown in FIG. 20(B), by the actuator 2142, the right portion 2107 and left portion 2108 of the stabilizer 2016 can be rotated relative to each other around the axis 2116 to reduce the shock on the vehicle, particularly the shock on its wheels on only one side of the vehicle, or improve the feeling of ride of the vehicle.

Figure 21:
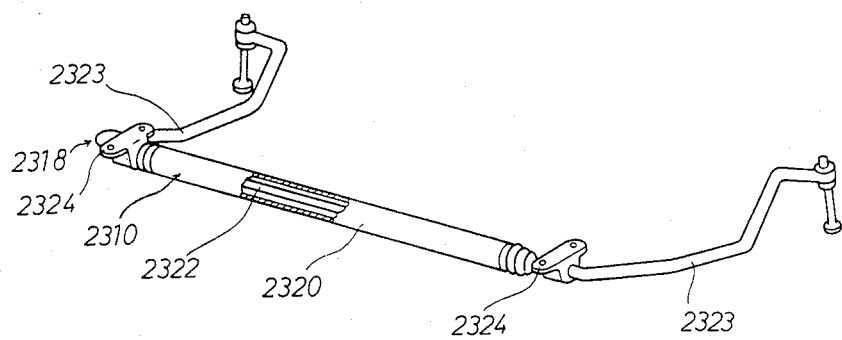
FIGS. 21(A) and 21(B) show a construction of another variable-stiffness stabilizer.
Figure 21:
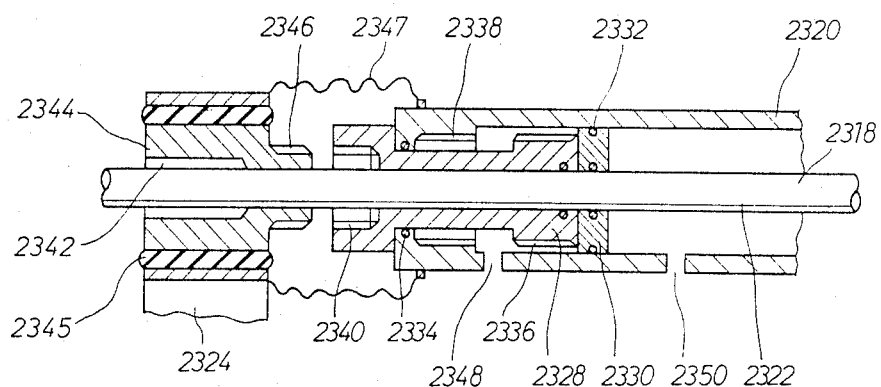

FIGS. 21(A) and 21(B) show another stabilizer as the fourth example. A stabilizer-bar-type assembly 2310 includes a first stabilizer bar 2318 and a second stabilizer bar 2320, as shown in FIG. 21(A). The first stabilizer bar 2318 includes a main portion 2322 and an arm 2323. The main portion 2322 is attached to the body of a vehicle by a pair of fitting metals 2324 so that the main portion 2322 can be twisted around its axis. The second stabilizer bar 2320 is hollow so that the main portion 2322 of the first stabilizer bar 2318 extends through the second stabilizer bar, as shown in FIG. 21(B). The second stabilizer bar 232 is disposed inside the pair of fitting metals 2324 so that the first stabilizer bar 2318 can be connected to and disconnected from the second stabilizer. A piston 2330 on which a spool 2328 is secured is slidably disposed inside one end of the second stabilizer bar 2320 in such a manner that the piston is liquid-tightly sealed by a sealing member 2332. The spool 2328 is liquid-toghtly sealed by a sealing member 2334, and projects out of the second stabilizer bar 2320. The spool 2328 has splines 2336 near the pistons 2330, while the second stabilizer bar 2320 has, at one end, splines 2338 which can be engaged with the splines 2336. The spool 2328 has other splines 2340 inside the outwardly projecting end of the spool. A coupler 2344 is connected to the main portion 2322 of the first stabilizer bar 2318 by splines 2342. Splines 2346, which can be engaged with the splines 2340, are provided on the coupler 2344 at the end opposed to the spool 2328. The coupler 2344 is connected to a mounting metal 2324 through a rubber bush 2345, as shown in FIG. 21(B), so that the main portion 2322 of the first stabilizer bar 2318 is twisted by deforming the bush 2345. The coupler 2344 is fitted in such a position that the splines 2340 are engaged with the splines 2346 when the spool 2328 is moved leftward as to the drawings and the splines 2336 are engaged with the splines 2338. A bellowslike boot 2347 for protecting the splines 2340 and 2346 from dust is provided between the coupler 2344 and the second stabilizer bar 2320. Two ports 2348 and 2350 are provided in the second stabilizer bar 2320 in such a manner that the piston 2330 is located between the ports. Piping is provided to lead a pressure fluid to the ports 2348 and 2350 in use. When the pressure fluid is led to one port 2350 through an actuator such as a pressure control valve, the piston 2330 is moved leftward as to the drawings, together with the spool 2328, the splines 2336 are engaged with the splines 2338, and the splines 2340 are engaged with the splines 2346. As a result, the first and the second stabilizer bars 2318 and 2320 are coupled to each other so that the stiffness of the stabilizer bar assembly is heightened. When the pressure fluid is led to the other port 2348, the piston 2330 is moved rightward and the splines are disengaged from each other. As a result, the stiffness of the stabilizer bar assembly is constituted by only that of the first stabilizer bar 2318.

Figure 22:
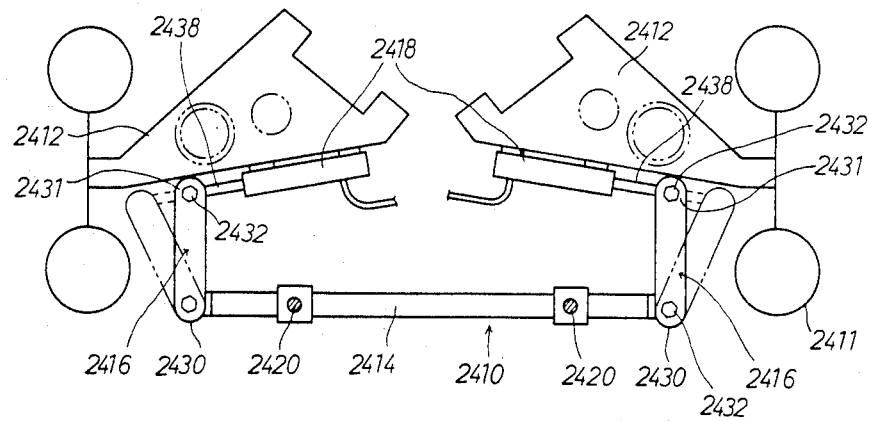
FIGS. 22(A), and 22(B) and 22(C) show a construction of still another variable-stiffness stabilizer.
Figure 22:
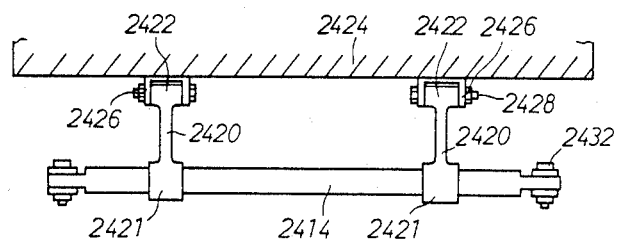
Figure 22:
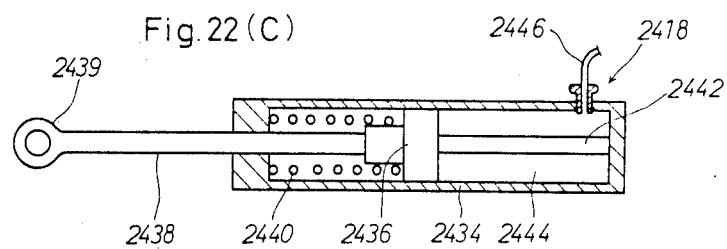

FIGS. 22(A), 22(B) and 22(C) show still another stabilizer as the fifth example. FIG. 22(A) shows a plan view of the outline of the stabilizer 2410. Wheels 2411 and suspension arms 2412 are also shown in FIG. 22(A). A main part 2414, a pair of arms 2416 and elongation means 2418 are provided. The main part 2414 like a round bar is laid through the bearing portions 2421 of a pair of links 2420 disposed at a distance from each other in the direction of the width of the body 2424 of a vehicle, and is supported by the bearing portions 2421 so that the main part 2414 can be twisted around its axis. The other bearing portions 2422 of the links 2420 at the upper ends are rotatably supported by pins 2428 extending through brackets 2426 welded on the vehicle body 2424. As a result, the main part 2414 is disposed along the width of the vehicle body, and can be twisted relative to the vehicle body. The pair of arms 2416 are made of flat bars. The first ends 2430 of the amrs 2416 are coupled to the ends of the main part 2414 by blots and nuts 2432 so that the arms can be turned about vertical axes. The second ends 2431 of the arms 2416 are located at a distance from the first ends 2430 in the front-to-rear direction of the vehicle body 2424. The front-to-rear direction includes an oblique longitudinal direction. The second ends 2431 of the arms 2416 are displaced in the direction of the width of the vehicle body 2424 by the elongation means 2418 made of power cylinders. Each of the power cylinders includes a cylinder 2434, a piston 2436 liquid-tigntly and slidably fitted in the cylinder 2434, a piston rod 2438 coupled at one end to the piston 2436 and projecting at the other end out of the cylinder 2434, and a included spring 2440 for displacing the piston 2436 in such a direction as to retract the piston rod 2438. A stopper 2442 secured on the piston 2436 prevents the piston from being displaced more than a predetermined quantity. The cylinder 2434 is secured on the suspension arm 2412 in such a manner that the piston rod 2438 is located more outside than the cylinder 2434 in the direction of the width of the vehicle body. The second end 2431 of the arm 2416 is coupled to the outwardly projecting end of the piston rod 2438 by a bolt and nut 2432 so that the arm 2416 can be turned about the vertical axis. One end of a flexible hose 2446 is connected to the liquid chamber 2444 of the cylinder 2434 opposite the side on which the included spring 2440 is located. The other end of the flexible hose 2446 is connected to a pressure generator (not shown in the drawings) throught an actuator such as prssure control valve. Unless pressure is applied to the liquid chambers 2444 of the power cylinders according to the state of the actuator corresponding to an instruction from an ECU 300, the second ends 2431 of the arms 2416 are located in inner positions as shown in FIG. 22(A), so that the wheel rate of the stabilizer is low. When the actuator is operated to apply pressure to the liquid chambers 2444 of the power cylinders, the pressure acts to the pistons 2436 to push out the piston rods 2438 against the compressed springs 2440. As a result, the second ends 2431 of the arms 2416 are pushed out as shown by imaginary lines, i.e. double dotted lines, in FIG. 22(A), to increase the arm ratio of the stabilizer to heighten its stiffness against the rolling of the vehicle.

Figure 23:
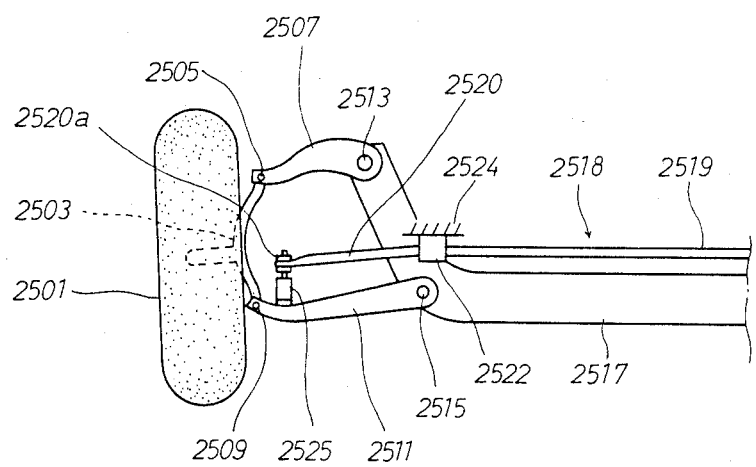
FIGS. 23(A) and 23(B) show a construction of a unit for coupling a variable-stiffness stabilizer and a lower control arm to each other.
Figure 23:
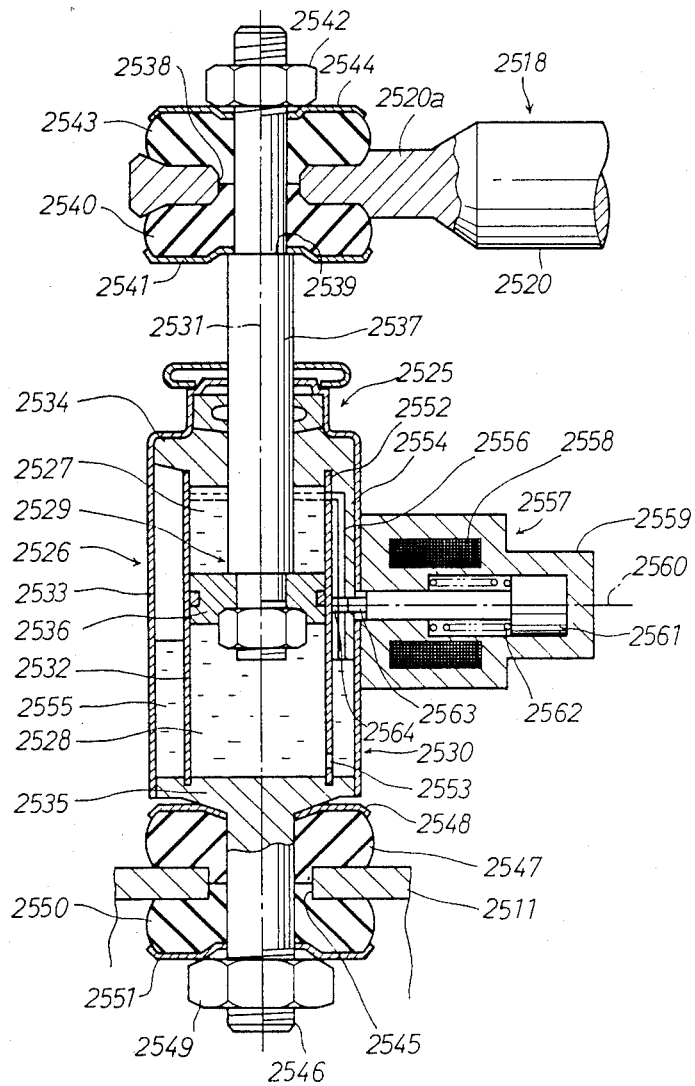

FIGS. 23(A) and 23(B) show a construction of a coupling unit for a stabilizer and a lower control arm, as the sixth example. FIG. 23(A) shows a partial front view of a wishbone-type suspension including the coupling unit for the stabilizer for a vehicle. FIG. 23(B) shows an enlarged sectional view of the coupling unit shown in FIG. 23(A). A wheel 2501 is rotatably supported by a knuckle 2503. The knuckle 2503 is pivotally coupled at the upper end to one end of an upper control arm 2507 by a pivot 2505, and pivotally coupled at the other end to one end of the lower control arm 2511 by a pivot 2509. The upper control arm 2507 and the lower control arm 2511 are pivotally coupled to the cross member 2517 of the vehicle by pivots 2513 and 2515. The stabilizer 2518, which is shaped as U, is disposed along the width of the vehicle. The stabilizer 2518 is coupled at its central rod 2519 to the body 2524 of the vehicle by brackets 2522 with rubber bushes not shown in the drawings, so that the stabilizer can be turned about its axis. The tip 2520a of the arm 2520 of the stabilizer 2518 is coupled to a point near one end of the lower control arm 2511 by the coupling unit 2525.

The coupling unit 2525 includes a piston-cylinder assembly 2526 composed of a piston 2529 and a cylinder 2530 which difine two cylinder chambers 2527 and 2528 as shown in detail in FIG. 13. The cylinder 2530 includes an inner cylinder 2532 which supports the piston 2529 movably back and forth along an axis 2531, and outer cylinder 2533 disposed substantially concentrically to the inner cylinder 2532, and end caps 2534 and 2535 which close both the ends of the inner cylinder and the outer cylinder. The piston 2529 includes a main portion 2536, and a piston rod 2537 which bears the main portion 2536 at one end of the piston rod and extends along the axis 2531 through the end cap 2534 and the hole 2538 of the tip of the arm 2520 of the stabilizer 2518.

A rubber bush 2540 and a retainer 2541 for holding the bush are interposed between the shoulder 2539 of the piston rod 2537 and the tip 2520a. A rubber bush 2543 and a retainer 2544 are interposed between the tip 2520a and a nut 2542 screwed on the front end of the piston rod 2537. As a result, the piston rod 2537 is coupled to the tip 2520a of the arm 2520 of the stabilizer 2518 so that an impulsive force is damped. A rod 2546, which extends along the axis 2531 through a hole 2545 of the lower control arm 2511, as secured on the end cap 2535. A rubber bush 2547 and a retainer 2548 for holding the bush are interposed between the end cap 2535 and the lower control arm 2511. A rubber bush 2550 and a retainer 2551 for holding the bush are interposed between the lower control arm 2511 and a nut 2549 screwed on the front end of the rod 2546. As a result, the rod 2546 is coupled to the lower control arm 2511 so that an impulsive force is damped.

The inner cylinder 2532 is provided with through holes 2552 and 2553 near the end caps 2534 and 2535. The end cap 2534 is integrally provided with a projection 2554 extending along the axis 2531 between the inner cylinder 2532 and the outer cylinder 2533 and located in tight contact with the inner and the outer cylinders. The projection 2554 has an internal passage 2556 which is coincident at one end with the through hole 2552 and is opened at the other end into an annular space 2555 between the inner cylinder 2532 and the outer cylinder 2533. As a result, the through hole 2552, the internal passage 2556, the annular space 2555 and the other through hole 2553 constitute a passage means for connecting both the cylinder chambers 2527 and 2528 to each other. A portion of the annular space 2555 is filled with air. Portions of the cylinder chambers 2527 and 2528, the internal passage 2556 and the annular 2555 are filled with oil. The change in the volume of the piston rod 2537 in the cylinder 2530, which is caused by the displacement of the piston 2529 relative to the cylinder, is compensated by the compression or expansion of the air filled in the portion of the annular space 2555.

The communication of the internal passage 2556 is selectively controlled by normally-opened solenoid valve 2557. The solenoid valve 2557 includes a housing 2559 containing a solenoid 2558 and secured at one end on the outer cylinder 2533, a core 2561 supported in the housing 2559 movably back and forth along an axis 2560, and a compressed helical spring 2562 for urging the core 2561 rightward as to FIG. 23(B). A valve element 2563 is integrally provided at one end of the core 2561 so that the valve element is selectively fitted into a hole 2564 extending in the projection 2554 across the internal passage 2556.

When no electricity is applied to the solenoid 2558 according to an instruction from an ECU 300, the core 2561 is urged rightward as to the drawing, by the compressed helical spring 2562, to open the valve 2557 to allow the communication of the internal passage 2556. When electricity is applied to the solenoid 2558 according to an instruction from the ECU 300, the core 2561 is driven leftward as to the drawings, against the force of the compressed helical spring 2562, to fit the valve solenoid 2563 into the hole 2564 to shut the internal passage 2556. At that time, the cylinder chambers 2527 and 2528 are disconnected from each other, and the oil in the cylinder chambers is kept from flowing to the opposite cylinder chambers, so that the piston 2529 is hindered from moving relative to the cylinder 2530 along the axis 2531. As a result, the stabilizer 2518 is put in such a state that it can fulfill its function to suppress the rolling of the vehicle to improve the controllability and the stability of the vehicle as its wheel on one side moves up on a protrusion of a road surface for the vehicle and down into a sinking of a road surface.

When no electricity is applied to the solenoid 2558, the solenoid valve 2557 is maintained in an open position shown in FIG. 23(B), so that the oil in both the cylinder chambers 2527 and 2528 can freely flow to the opposite cylinder chambers through the internal passage 2556 and so forth. As a result, the piston 2529 can freely move relative to the cylinder 2530 so that the tips of both the right and left arms 2520 can freely move relative to the corresponding lower control arms 2511. For that reason, the stabilizer does not fulfill its function, so that the shock at each rear wheel of the vehicle is reduced to keep the feeling of ride of the vehicle good.

What is claimed is:

1. A rear wheel suspension controller for a vehicle having a suspension between a body and a wheel of the vehicle, comprising:
   front wheel vehicle height detection means for detecting a distance between a front wheel and the body of the vehicle as a height of the vehicle and for generating a front wheel vehicle height signal;
   judgement means for comparing the front wheel vehicle height signal with a predetermined reference range signal that is independent of a rear height value and for generating a judgment result signal when the front wheel vehicle height signal is out of the predetermined reference range signal;
   rear wheel suspension characteristic alteration means for performing control to alter the characteristic of a rear wheel suspensions responsive to the judgement result signal.

2. A rear wheel suspension controller as claimed in claim 1, wherein the rear wheel suspension controller include a return means for performing such control that the characteristic of the suspension altered by the rear wheel suspension alteration means is returned to the original unaltered state a predetermined time interval after the judgement result signal is generated.

3. A rear wheel suspension controller as claimed in claim 2, wherein the predetermined time interval is determined in accordance with the speed of the vehicle.

4. A rear wheel suspension controller as claimed in claim 1, wherein:
   the front wheel vehicle height detection means comprise right front wheel vehicle height detection means for detecting a distance between the right front wheel and the body of the vehicle and for generating a right front wheel vehicle height signal, and left front wheel vehicle height detection means for detecting a distance between the left front wheel and the body of the vehicle and for generating a left front wheel vehicle height signal;
   the judgement means comprise a right judgement means for comparing the right front wheel vehicle height signal with a predetermined reference signal and for generating a right judgement result signal when the right front wheel vehicle height signal is greater than the predetermined reference range signal, and left judgement means for comparing the left front wheel vehicle height signal with a predetermined reference range signal and for generating a left judgement result signal when the left front wheel vehicle height signal is out of the predetermined reference range signal;

the rear wheel suspension characteristic alteration means comprising right rear wheel suspension characteristic alteration means for performing control to alter the characteristic of the right rear wheel suspension in accordance with the right judgment result signal, and left rear wheel suspension characteristic alteration means for performing control to alter the characteristic of the left rear wheel suspension in accordance with the left judgement result signal.

5. A rear wheel suspension controller as claimed in claim 4, wherein the rear wheel suspension controller comprise right return means for performing such control that the characteristic of the right rear wheel suspension altered by the right rear wheel suspension characteristic alteration means is returned to the original unaltered state a predetermined time interval after the right judgment result signal is generated, and comprise left return means for performing such control that the characteristic of the left rear wheel suspension altered by the left rear wheel suspension characteristic alteration means is returned to the original unaltered state a predetermined time interval after the left judgment result signal is generated.

6. A rear wheel suspension controller as claimed in claim 1, wherein a signal indicating a displacement of the height of the vehicle from an average height thereof is generated as the front wheel vehicle height signal by the vehicle height detection means.

7. A rear wheel suspension controller as claimed in claim 1, wherein a signal indicating a speed of the displacement of the height of the vehicle is generated as the front wheel vehicle height signal by the vehicle height detection means.

8. A rear wheel suspension controller as claimed in claim 1, wherein a signal indicating an acceleration of the displacement of the height of the vehicle is generated as the front wheel vehicle height signal by the vehicle height detection means.

9. A rear wheel suspension controller as claimed in claim 1, wherein a signal indicating an amplitude of the displacement of the height of the vehicle is generated as the front wheel vehicle height signal by the vehicle height detection means.

10. A rear wheel suspension controller as claimed in claim 1, wherein the rear wheel suspension controller include means for selecting whether or not the front wheel vehicle height signal should be compared with the predetermined reference range signal by the judgement means.

* * * * *